United States Patent
Sevindik et al.

(10) Patent No.: US 11,690,137 B2
(45) Date of Patent: Jun. 27, 2023

(54) MULTIPLE-LAYER WIRELESS STATION IMPLEMENTATIONS AND MANAGEMENT

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 281 days.

(21) Appl. No.: 17/015,745

(22) Filed: Sep. 9, 2020

(65) Prior Publication Data
US 2022/0078887 A1    Mar. 10, 2022

(51) Int. Cl.
| | |
|---|---|
| H04B 7/06 | (2006.01) |
| H04W 72/52 | (2023.01) |
| H04W 88/10 | (2009.01) |
| H04W 76/15 | (2018.01) |
| H04W 76/11 | (2018.01) |

(52) U.S. Cl.
CPC ......... *H04W 88/10* (2013.01); *H04B 7/0608* (2013.01); *H04W 72/52* (2023.01); *H04W 76/11* (2018.02); *H04W 76/15* (2018.02)

(58) Field of Classification Search
CPC ........... H04B 7/0608; H04W 72/0486; H04W 76/11; H04W 76/15
See application file for complete search history.

(56) References Cited

U.S. PATENT DOCUMENTS

| | | | |
|---|---|---|---|
| 6,973,037 B1* | 12/2005 | Kahveci | H04Q 11/0464 370/236 |
| 2002/0159506 A1* | 10/2002 | Alamouti | H04L 5/026 375/147 |
| 2004/0196813 A1* | 10/2004 | Ofek | H01Q 21/065 370/334 |
| 2012/0094650 A1* | 4/2012 | Lei | H04W 72/0426 455/422.1 |

(Continued)

OTHER PUBLICATIONS

C. D. Rouse, B. R. Petersen, and B. G. Colpitts, "Characterising an In-Room MIMO System Employing Elevation-Directional Access Point Antennas," Wireless Personal Communications, vol. 96, No. 3, pp. 3889-3905, Oct. 2017 (Year: 2017).*

(Continued)

*Primary Examiner* — Gary Mui
(74) *Attorney, Agent, or Firm* — Armis IP Law, LLC

(57) ABSTRACT

A communication system includes a wireless base station and a channel allocation management resource. The wireless base station receives allocation of a first wireless channel from a communication management resource. Via the first wireless channel, the wireless base station establishes a first communication layer in which to communicate with first wireless communication devices using the allocated first wireless channel. The wireless base station establishes a second communication layer in which to communicate with second wireless communication devices using the allocated first wireless channel. Via the first communication layer and the second communication layer, the wireless base station provides the first wireless communication devices and that the second wireless communication devices access to a respective remote network.

35 Claims, 14 Drawing Sheets

(56) References Cited

U.S. PATENT DOCUMENTS

| | | | |
|---|---|---|---|
| 2013/0064239 A1* | 3/2013 | Yu | H04W 72/046 |
| | | | 370/350 |
| 2014/0143409 A1* | 5/2014 | Ali | H04L 43/0876 |
| | | | 709/224 |
| 2014/0211731 A1* | 7/2014 | Inoue | H04B 7/0626 |
| | | | 370/329 |
| 2015/0016379 A1* | 1/2015 | Nam | H04B 7/0639 |
| | | | 370/329 |
| 2015/0207700 A1* | 7/2015 | Elmdahl | H04W 72/0406 |
| | | | 370/241.1 |
| 2016/0165457 A1* | 6/2016 | Inoue | H04B 7/0695 |
| | | | 455/562.1 |
| 2016/0183275 A1* | 6/2016 | Inoue | H04B 7/0695 |
| | | | 455/450 |
| 2017/0005775 A1* | 1/2017 | Cheng | H04L 5/14 |
| 2017/0134913 A1* | 5/2017 | Cui | H04W 16/28 |
| 2018/0316402 A1* | 11/2018 | Jalden | H04B 7/0617 |
| 2019/0068259 A1* | 2/2019 | Liu | H04B 7/0639 |
| 2019/0124520 A1* | 4/2019 | Tang | H04W 16/28 |
| 2019/0373610 A1* | 12/2019 | Cimpu | H04W 72/06 |
| 2020/0187098 A1* | 6/2020 | Dhillon | H04W 64/003 |
| 2021/0036748 A1* | 2/2021 | Brown | H04B 7/0452 |

OTHER PUBLICATIONS

W. Xie, T. Yang, X. Zhu, F. Yang and Q. Bi, "Measurement-Based Evaluation of Vertical Separation MIMO Antennas for Base Station," in IEEE Antennas and Wireless Propagation Letters, vol. 11, pp. 415-418, 2012, doi: 10.1109/LAWP.2012.2194688. (Year: 2012).*

* cited by examiner

MULTIPLE-LAYER WIRELESS STATION IMPLEMENTATIONS AND MANAGEMENT

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or customer premises equipment. For example, a base station can be configured to communicate with the SAS to receive notification of a wireless channel allocated for its use.

Subsequent to wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

BRIEF DESCRIPTION OF EMBODIMENTS

Embodiments herein provide novel ways of providing improved wireless communications to one or more communication devices in a network environment.

For example, in one embodiment, a communication system includes a wireless base station and a channel allocation management resource. Assume that the wireless base station receives allocation of a first wireless channel from a communication management resource. Via the first wireless channel, the wireless base station establishes a first communication layer in which to communicate with first wireless communication devices using the allocated first wireless channel. In addition to the first communication layer, the wireless base station establishes a second communication layer in which to communicate with second wireless communication devices using the allocated first wireless channel or other allocated wireless channel(s). Via the first communication layer and the second communication layer, the wireless base station provides the first wireless communication devices and that the second wireless communication devices access to a respective remote network.

In further example embodiments, the wireless base station includes first antenna hardware to support the first communication layer; the wireless base station includes second antenna hardware to support the second communication layer. In one embodiment, the wireless base station controls operation of the first antenna hardware of the wireless base station to establish the first communication layer and communicate with the first wireless communication devices; the wireless base station controls operation of second antenna hardware of the wireless base station to establish the second communication layer and communicate with the second wireless communication devices. Thus, each communication layer (wireless network with unique identity) supports wireless connectivity with different communication devices.

In one embodiment, the first antenna hardware and the second antenna hardware in the wireless base station are vertically spaced apart from each other.

In still further example embodiments, a spacing between the first antenna hardware and the second antenna hardware is greater than a spacing threshold value. In one embodiment, the spacing threshold value is sufficiently large to prevent correlation of first wireless signals from the first antenna hardware and second wireless signals from the second antenna hardware. In other words, because of the antenna spacing, the first wireless signals in the first communication layer are not correlated with the second wireless signals in the second communication layer.

Further embodiments herein include, via the first communication layer implemented by the wireless base station, communicating with the first communication devices via first wireless communications; and via the second communication layer implemented by the wireless base station, communicating with the second communication devices via second wireless communications. As previously discussed, in one embodiment, the second wireless communications are uncorrelated with respect to the first wireless communications.

In one embodiment, the second antenna hardware is physically separated from the first antenna hardware by a distance value above a threshold value depending on a carrier frequency of the allocated first wireless channel. For example, in one embodiment, the distance value or spacing is greater than half the wavelength of the first carrier frequency.

Note that the wireless base station can be allocated wireless channels from any suitable wireless spectrum. In one embodiment, the one or more wireless channel allocated to the wireless base station to support the multiple communication layers is allocated from a tiered wireless communication hierarchy in which an incumbent user is ranked higher in priority than the wireless base station.

Yet further, the wireless base station can be configured to dynamically adjust a number of communication layers implemented by the wireless base station. For example, further embodiments herein include, via the wireless base station, monitoring bandwidth usage of the first communication layer provided to first wireless communication devices; and establishing the second communication layer in response to detecting that the bandwidth usage of the first communication layer is above a threshold value. Thus, if the first communication layer becomes congested or experiences a heavy load, embodiments herein include instantiating the second communication layer.

Further embodiments herein include, via the wireless base station: i) receiving an identity of a second wireless channel allocated to the wireless base station; ii) implementing the first communication layer via first communications from first antenna hardware of the wireless base station to the first wireless communication devices using the first wireless channel; and iii) implementing the second communication layer via second communications from second antenna hardware of the wireless base station to the second wireless communication devices using the first wireless channel and/or second wireless channel.

In still further example embodiments, the wireless base station implements the second communication layer via third communications from the second antenna hardware of the wireless base station to the second wireless communication devices using the first wireless channel. Thus, the first communication layer and the second communication layer can be configured to support simultaneous wireless communications using the first wireless channel.

In response to detecting that communications transmitted from the second communication layer fall below a threshold value, the wireless base station (or other suitable entity) notifies the channel allocation management resource to deallocate the second wireless channel from the wireless base station. In such an instance, the allocation management resource deallocates use of the second wireless channel from the wireless base station. Thus, the second wireless channel is not needlessly allocated to the wireless base station since it is not needed.

As previously discussed, each of the communication layers can be partitioned into different sectors. For example, embodiments herein include partitioning the first communication layer into first spatially distinct sectors; and partitioning the second communication layer into second spatially distinct sectors. Still further embodiments herein include, via the wireless base station, implementing use of the first wireless channel via simultaneous use of the first wireless channel in the first spatially distinct sectors and the second spatially distinct sectors.

Further Embodiments

Yet further embodiments herein include a multi-layer and multi sector CBSD deployment model in fixed wireless access for CBRS.

In one embodiment, the wireless base station implements multiple sectors and multiple communication layers. In one embodiment, a communication layer includes multiple sectors, and depending on the number of communication layers as well as the number of total sectors in each communication layer is adjustable. For example, if the wireless base station is implemented via 4 communication layers, the total number of sectors will be 3 sectors×4 layers=12 sectors assuming that each communication layer is partitioned into 3 sectors.

In accordance with further example embodiments, the network architecture is implemented via virtual radio access network technology. In this model, the system includes a central unit, distributed unit, and radio units. The central unit has all functionalities of base band processing unit which can execute all protocol layers, and distributed unit executes a few of protocol layers, and radio unit has all the antenna/sector functionalities.

The following description includes multiple operations associated with the communications as described herein.

Operation #1—A CBSD central unit (a.k.a., multi-tier wireless base station supporting multiple communication layers) registers with a SAS (allocation management resource) for a wireless channel and single communication layer. In the registration process, the CBSD central unit communicates with SAS for spectrum grant (such as one or more wireless channels.

Operation #2—The SAS (allocation management resource) grants spectrum (such as one or more wireless channels) to a single communication layer of the CBSD wireless base station. In one embodiment, the single communication layer is implemented via a first antenna hardware disposed in a first communication layer of the multi-tier wireless base station.

Operation #3—The CBSD central unit (wireless base station) implements multiple sectors in a single communication layer using the allocated spectrum such as one or more wireless channels. In one embodiment, each sector in the communication layer is non-overlapping and supports communications via the allocated spectrum.

Operation #4—The CBSD central unit (wireless base station) measures the load of communicating data to each of multiple communication devices in each sector of each communication layer. In one embodiment, the load is measured based on parameters such as number of users connected per sector, number of users connected to all sectors, number of dropped calls/sector, number of paging messages, amount of downlink and uplink data throughput/sector, average data transmission latency/sector, etc.

Operation #5—If the current sector communication layer of the CBSD (wireless base station) is loaded more than a specified threshold such as for some duration of time, the CBSD central unit (wireless base station) will turn on or implement (instantiate or activate) a second communication layer of one or more sectors. In one embodiment, the wireless base station requests the SAS to grant new spectrum (such as one or more additional wireless channels) for implementing the second communication layer of sectors. After the SAS grants additional spectrum, the CBSD central unit triggers its radio unit to turn on signal transmission using the granted wireless spectrum.

In accordance with further example embodiments, the multi-tier wireless base station implements the second communication layer via a second antenna hardware vertically spaced apart from the first and hardware. The vertical spacing of the first antenna hardware and the second antenna hardware ensures that the communication signals transmitted from the first antenna hardware in the first allocated wireless channel are not correlated with communication signals transmitted from the second antenna hardware in the first allocated wireless channel.

Operation #6—The CBSD central unit (multi-tier wireless base station) measures the load in a newly implemented sector layer (such as the second communication layer), and if the load in the second communication layer also increases beyond a defined threshold value, the CBSD central unit (wireless base station) implements a third communication layer of sectors. The wireless base station requests the SAS (wireless channel allocation management resource) for additional wireless spectrum to implement the third communication layer via corresponding third antenna hardware of the wireless base station. In one embodiment, the wireless base station supports communications in the first communication layer using the first allocated wireless channel; the wireless base station supports communications in the second communication layer using the first allocated wireless channel and the second wireless channel; the wireless base station supports communications in the third communication layer using the first, second, and additional third allocated wireless channels.

As previously discussed, vertical spacing of the second antenna hardware with respect to the second antenna hardware ensures that the communication signals transmitted from the second antenna hardware in the first allocated wireless channel are not correlated with communication signals from the second antenna hardware transmitted in the first allocated wireless channel or communication signals from the first antenna hardware transmitted in the first allocated wireless channel.

In one embodiment, as previously discussed, each communication layer of the multi-tier wireless base station supports multiple sectors. For example, the first communication layer supports a first set of non-overlapping regions of wireless coverage; the second communication layer support a second set of nonoverlapping regions of wireless coverage;

the third communication layer supports a third set of non-overlapping regions of wireless coverage; and so on.

Operation #7—Among the multiple implemented layers, if the load on a particular layer reduces below a threshold value for a duration of time, the CBSD central unit (wireless base station) turns off a respective layer of sectors and notifies the allocation management resource (SAS) to revoke a portion of allocated wireless spectrum. For example, if the wireless base station discontinues providing wireless service over the third communication layer, the wireless base station notifies the allocation management resource to deallocate use of the third wireless channel.

Embodiments herein are useful over conventional techniques because they provide a unique way of providing wireless service amongst multiple different sets of communication devices via implementation of multiple wireless communication layers.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: receive allocation of a first wireless channel from a channel allocation management resource; via a wireless base station in communication with a remote network: i) establish a first communication layer in which to communicate with first wireless communication devices using the allocated first wireless channel, and ii) establish a second communication layer in which to communicate with second wireless communication devices using the allocated first wireless channel.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
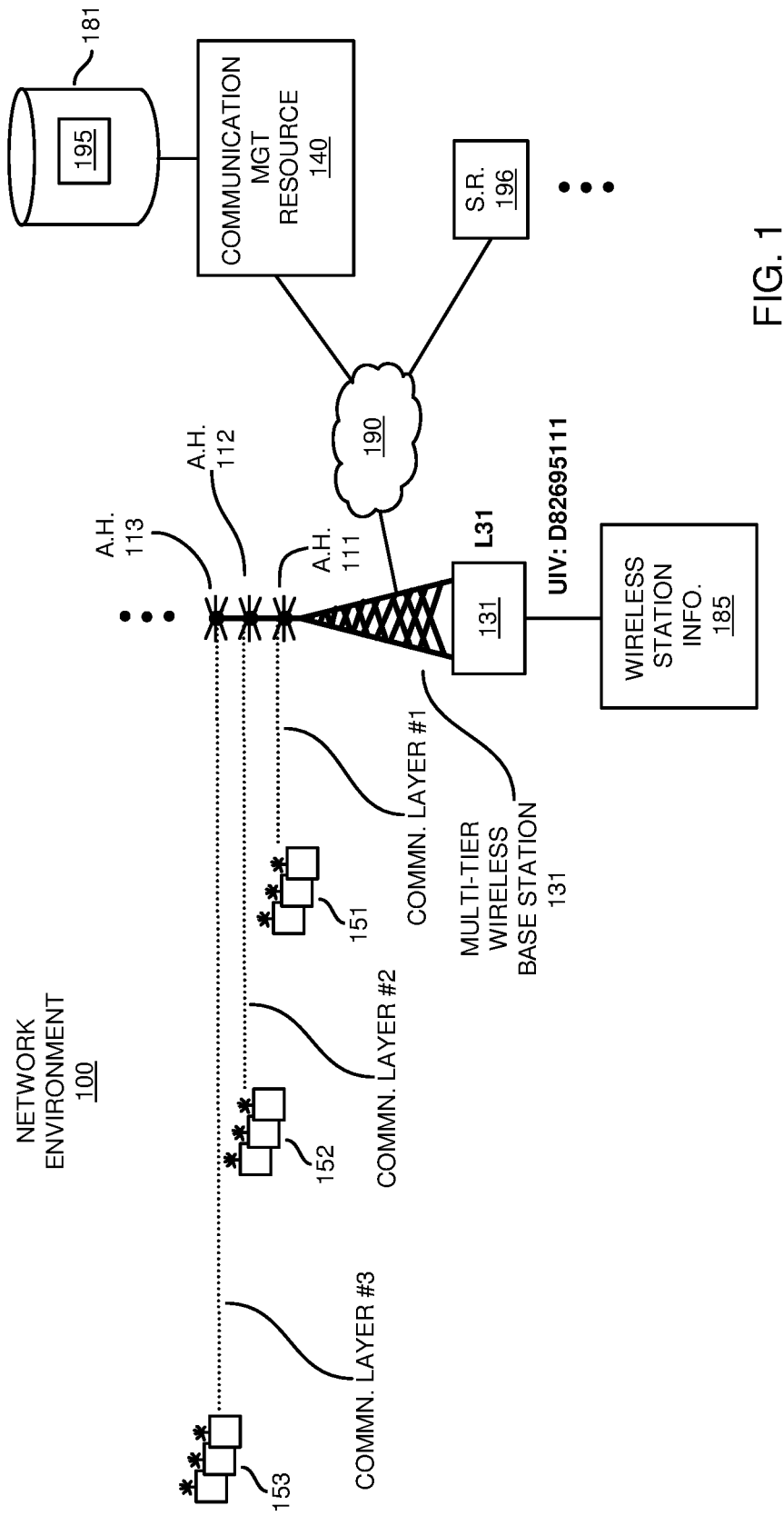
FIG. 1 is an example diagram illustrating a communication network environment and a multi-tier wireless base station according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes a multi-tier wireless base station and a channel allocation management resource. The wireless base station (such as a multi-tier wireless base station) receives allocation of a first wireless channel from a communication management resource. Via the first wireless channel, the wireless base station establishes a first communication layer in which to communicate with first wireless communication devices using the allocated first wireless channel. The wireless base station establishes a second communication layer in which to communicate with second wireless communication devices using the allocated first wireless channel. In one embodiment, antenna hardware providing the second communication layer is vertically spaced apart from antenna hardware providing the first communication layer. Via the first communication layer and the second communication layer, the wireless base station provides the first wireless communication devices and that the second wireless communication devices access to a respective remote network.

Now, more specifically, with reference to the drawings, FIG. 1 is an example diagram illustrating a communication network environment and a multi-tier wireless base station according to embodiments herein.

As shown, network environment 100 includes any number of wireless base stations including wireless base station 131 (such as a multi-tier wireless base station). Wireless network environment 100 further includes network 190, server resource 196, and communication management resource 140.

Note that each of the resources in network environment 100 can be configured to include or be configured as appropriate hardware, software, or combination of hardware and software to carry out respective operations as discussed herein.

More specifically, the wireless base station the wireless base station 131 as described herein can be implemented via respective wireless base station hardware, wireless base station software, or a combination of both; the communication management resource 141 as described herein can be implemented via respective communication management hardware, communication management software, or a combination of both; etc.

As further shown in this example embodiment, multi-tier wireless base station 131 includes multiple instances of antenna hardware spaced apart (such as vertically or other orientation) from each other. For example, wireless base station 131 includes antenna hardware 111 (such as a wireless transmitter and wireless receiver) supporting communication layer #1 (such as first bidirectional wireless communications between the wireless base station 131 and the communication devices 151); wireless base station 131 includes antenna hardware 112 (wireless transmitter and wireless receiver) supporting communication layer #2 (such as second bidirectional wireless communications between the wireless base station 131 and the communication devices 152); wireless base station 131 includes antenna hardware 113 (wireless transmitter and wireless receiver) supporting communication layer #3 (such as third wireless communications between the wireless base station 131 and the communication devices 153); and so on.

In one embodiment, any of the communication devices 151, 152, 153, etc., are disposed at a respective fixed location such as in a subscriber domain. Additionally, or alternatively, the communication devices 151, 152, 153, etc., are mobile communication devices operated by roaming respective users/operators.

The communication management resource 140 can be implemented in any suitable manner. For example, in one embodiment, the communication management resource 140 (such as a channel/spectrum allocation management resource) is or includes a Spectrum Access System that allocates one or more wireless channels to entities in the network environment 100.

In one embodiment, the communication management resource 140 is configured to allocate any suitable type of wireless spectrum (bandwidth, wireless channels, etc.) for use by the multi-tier wireless base station 131, communication devices 151, 152, customer premises equipment, etc., in the network environment 100.

In accordance with further example embodiments, the one or more wireless channels (wireless bandwidth) allocated to the wireless base station 131 are allocated from a tiered wireless communication hierarchy in which an incumbent user (such as the government) is ranked higher in priority than the wireless base station 131. For example, in one non-limiting example embodiment, the communication management resource 140 allocates bandwidth to the wireless base station 131 from a so-called CBRS (Citizens Band Radio System) band operating between 3.550 and 3.700 GHz (GigaHertz) (such as 150 MegaHertz or 15 wireless channels that are each 10 MHz wide).

As further discussed herein, the multiple instances of antenna hardware in the multi-tier wireless base station 131 are vertically stacked to ensure that wireless communications transmitted at the same carrier frequency from each of the different instances of antenna hardware (such as antenna hardware 111, antenna hardware 112, antenna hardware 113, etc.) are uncorrelated with respect to each other.

As a further example, assume that the multi-tier wireless base station 131 simultaneously: i) transmits wireless communication 101 from the antenna hardware 111 at a first carrier frequency; ii) transmits wireless communication 102 from the antenna hardware 112 at the first carrier frequency; ii) transmits wireless communication 103 from the antenna hardware 113 at the first carrier frequency. Because of the vertical spacings between the antenna hardware 111, antenna hardware 112, and antenna hardware 113 as described herein, there is no signal correlation between wireless communications 101 and wireless communications 102; there is no signal correlation between wireless communications 102 and wireless communications 103; there is no signal correlation between wireless communications 101 and wireless communications 103.

Figure 2:
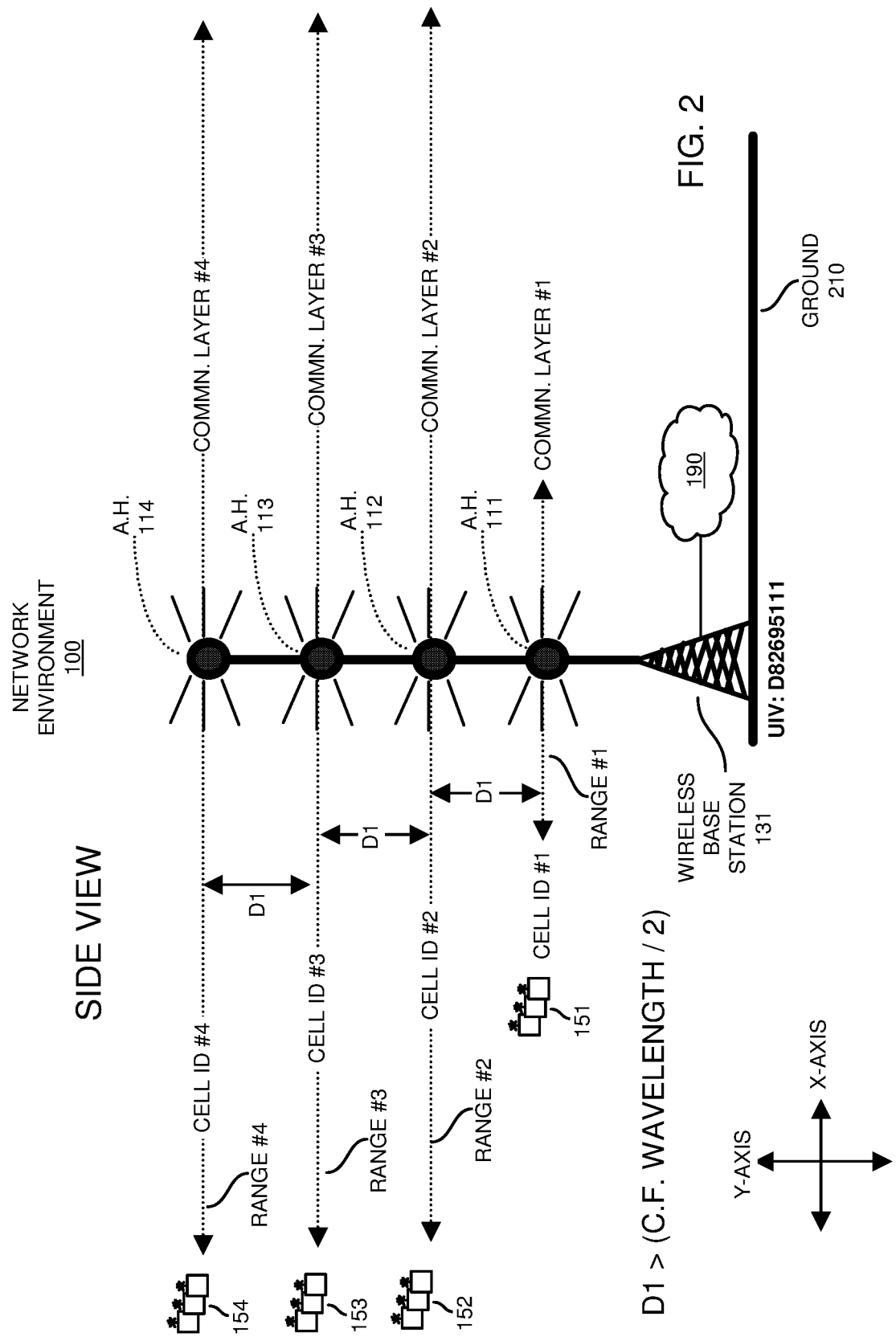
FIG. 2 is an example diagram illustrating multiple communication layers supported via a multi-tier wireless base station according to embodiments herein.

FIG. 2 is an example more detailed diagram illustrating multiple communication layers supported via a multi-tier wireless base station according to embodiments herein.

In accordance with further example embodiments, the wireless base station 131 controls wireless transmit operations from the first antenna hardware 111 of the wireless base station 131 to establish the communication layer #1 and communicate with the first wireless communication devices 151; the wireless base station 131 controls wireless transmit operations from the second antenna hardware 112 of the wireless base station 131 to establish the communication layer #2 and communicate with the second wireless communication devices 152; the wireless base station 131 controls wireless transmit operations from the third antenna hardware 113 of the wireless base station 131 to establish the communication layer #3 and communicate with the third wireless communication devices 153; the wireless base station 131 controls wireless transmit operations from the first antenna hardware 114 of the wireless base station 131 to establish the communication layer #4 and communicate with the fourth wireless communication devices 154; and so on.

As previously discussed, to ensure that transmitted wireless signals from the multiple instances of antenna hardware (111, 112, 113, 114, etc.) associated with the wireless base station 131 are not correlated, each of the communication layers and corresponding antenna hardware is spaced apart with respect to each other along the y-axis (such as vertical axes).

More specifically, the antenna hardware 111 resides at the lowest level nearest the ground level 210. Antenna hardware 112 of the wireless base station 131 resides above antenna hardware 111 and is vertically spaced apart with respect to the antenna hardware 111 by distance D1. Antenna hardware 113 of wireless base station 131 resides above and is vertically spaced apart with respect to the antenna hardware 112 by distance D1. Antenna hardware 114 of wireless base station 131 resides above and is vertically spaced apart with respect to the antenna hardware 113 by distance D1.

Note further that each of the different communication layers is identifiable via a respective identifier value. For example, the communication layer #1 is assigned cell identifier (such as PCI #1), the communication layer #2 is assigned cell identifier #2 (such as PCI #2); the communication layer #3 is assigned cell identifier #3 (such as PCI #3); the communication layer #4 (such as PCI #4) is assigned cell identifier #4. Thus, in one embodiment, the cell identifier for each communication layer is a so-called Physical Cell Identifier (or PCI such as in 4G/LTE standards or other suitable wireless communication protocol).

In one embodiment, the multi-tier wireless base station 131 broadcasts identities of each communication layer over one or more assigned carrier frequencies to provide notification of availability.

For example, the multi-tier wireless base station 131 broadcasts a first unique identity value (cell identifier #1) from the antenna hardware 111 to indicate availability of the communication layer #1 (such as a first wireless network); the multi-tier wireless base station 131 broadcasts a second unique identity value (cell identifier #2) from the antenna hardware 112 to indicate availability of the communication layer #2 (such as a second wireless network); the multi-tier wireless base station 131 broadcasts a third unique identity value (such as cell identifier #3) from the antenna hardware 113 to indicate availability of the communication layer #3 (such as a third wireless network); the multi-tier wireless base station 131 broadcasts a fourth unique identity value (such as cell identifier #4) from the antenna hardware 114 to indicate availability of the communication layer #4 (such as a fourth wireless network).

Via receipt of the discovery communications transmitted from the wireless base station 131, each of the communication devices in the network environment 100 is aware of the different available wireless networks supported by the communication layers of the wireless base station 131.

In still further example embodiments, the second antenna hardware 112 is physically separated from the first antenna hardware 111 by a distance value D1, which is greater than a threshold value depending on a carrier frequency of the wireless communications over the communication layers. More specifically, in one embodiment, the distance value or vertical spacing D1 is greater than half the wavelength of the carrier frequency used to communicate in communication layer #1.

In still further example embodiments, a spacing D1 between the first antenna hardware 111 and the second antenna hardware 112 is greater than a threshold value that is sufficiently large to prevent correlation of first wireless signals from the first antenna hardware 111 and second wireless signals from the second antenna hardware 112 transmitted at the same carrier frequency. In other words, as previously discussed, the spacing is sufficient that the first wireless signals at carrier frequency #1 from antenna hardware 111 are not correlated with the second wireless signals at carrier frequency #1 from the antenna hardware 112.

In still further example embodiments, note that the multi-tier wireless base station 131 can be configured to control the amount of power that respective wireless signals are transmitted from the respective instance of antenna hardware. Control of the wireless power level of transmitted wireless signals enables wireless base station 131 to control a range in which the respective communication devices are able to receive wireless signals from the wireless base station 131.

More specifically, in one embodiment, the wireless base station 131 transmits wireless signals from the antenna hardware 111 at a first wireless power lever to provide a first wireless range (range #1) associated with communication layer #1; the wireless base station 131 transmits wireless signals from the antenna hardware 112 at a second wireless power lever to provide a second wireless range (range #2) associated with communication layer #2; the wireless base station 131 transmits wireless signals from the antenna hardware 113 at a third wireless power lever to provide a third wireless range (range #3) associated with communication layer #3; the wireless base station 131 transmits wireless signals from the antenna hardware 114 at a fourth wireless power lever to provide a fourth wireless range (range #4) associated with communication layer #4.

Note further that the power level of communicating at each layer can be the same power level.

Figure 3:
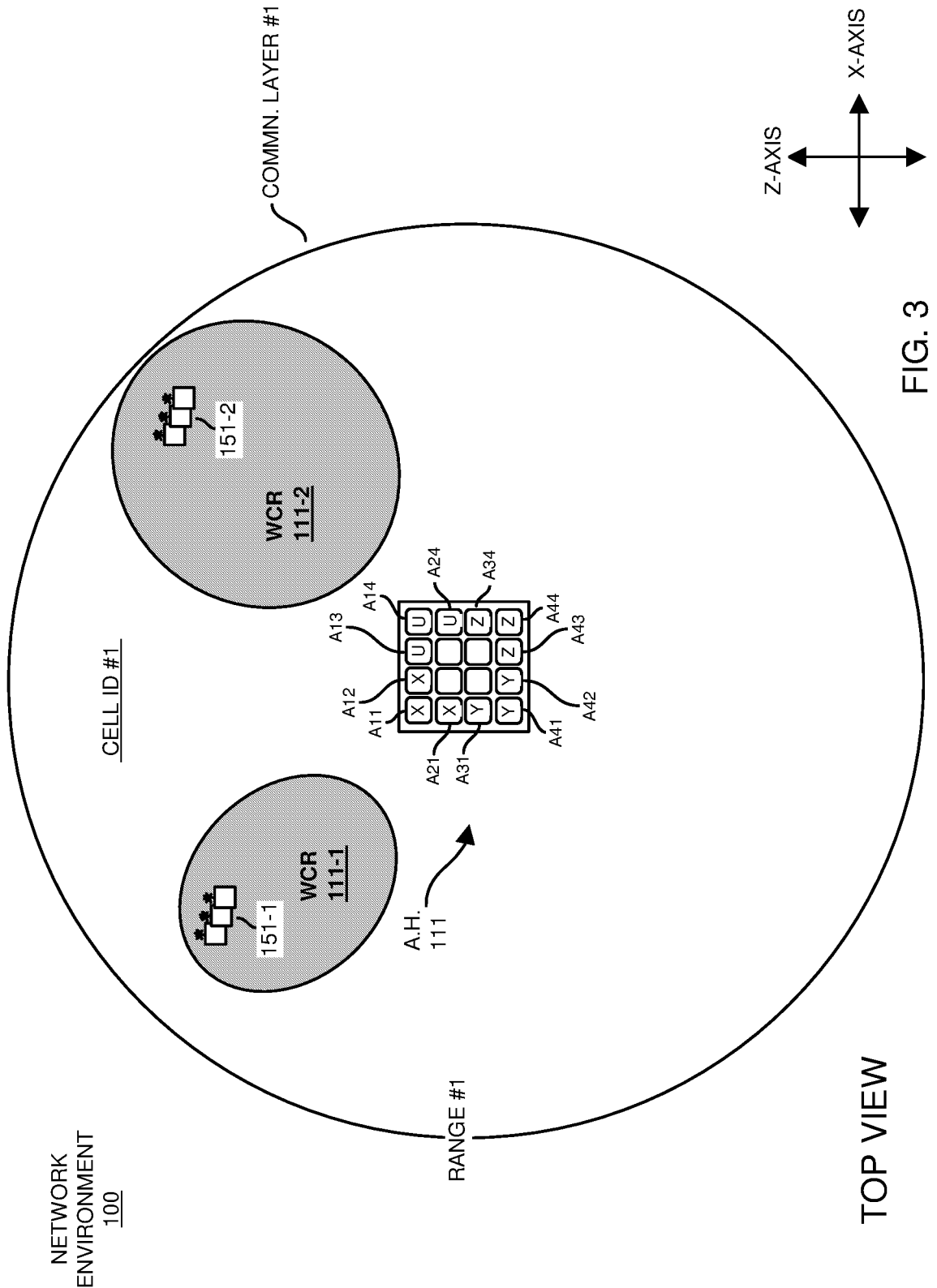
FIG. 3 is an example diagram illustrating wireless coverage provided by a first communication layer (first tier) of a multi-tier wireless base station according to embodiments herein.

FIG. 3 is an example top view diagram illustrating the dynamic variability of controlling wireless coverage at a first communication layer (first tier) of a multi-tier wireless base station according to embodiments herein.

In this embodiment, the antenna hardware 111 includes an array of multiple antenna elements A11, A12, A13, A14, A21, A22, A23, A24, A31, A32, A33, A34, A41, A42, A43, A44. Note that the antenna hardware 111 can include any number of antenna elements. The antenna elements can be arranged in any suitable manner.

In one embodiment, the antenna elements are arranged along as multiple parallel strings of antenna elements along the same axis as shown. Alternatively, the antenna elements are arranged in a different pattern.

Antenna elements associated with each instance of respective antenna hardware can be any suitable type of devices. For example, in one embodiment, the antenna elements represent devices such as a dipole antenna or other suitable transceiver (transmitter or receiver) resource.

In accordance with further example embodiments, the multi-tier wireless base station 131 controls a number of sectors supported by the antenna hardware. For example, in one embodiment, the wireless base station 131 or other suitable resource selects a first portion of the antenna elements such as antenna element A21, A11, and A12 to provide beamforming in communication layer #1 and corresponding wireless coverage region 111-1; the wireless base station 131 or other suitable resource selects a second portion of the antenna elements such as antenna element A13, A14, and A24 to provide beamforming in communication layer #1 and corresponding wireless coverage region 111-2.

Thus, from an aerial view (i.e., top view looking down on the wireless base station 131), the wireless base station 131 provides wireless connectivity in communication layer #1 to communication devices 151-1 via wireless coverage region 111-1; the wireless base station 131 provides wireless connectivity in communication layer #1 to communication devices 151-2 via wireless coverage region 111-2.

Note further that the wireless base station 131 can be configured to dynamically change the region of wireless coverage provided by selected groupings of antenna elements in the antenna hardware 111. For example, in response to detecting a need for additional coverage via communication layer #1 to communication devices, the wireless base station 131 implements one or more additional regions of wireless coverage. Thus, the number of wireless coverage regions can vary in a respective communication layer on an as-needed basis.

Figure 4:
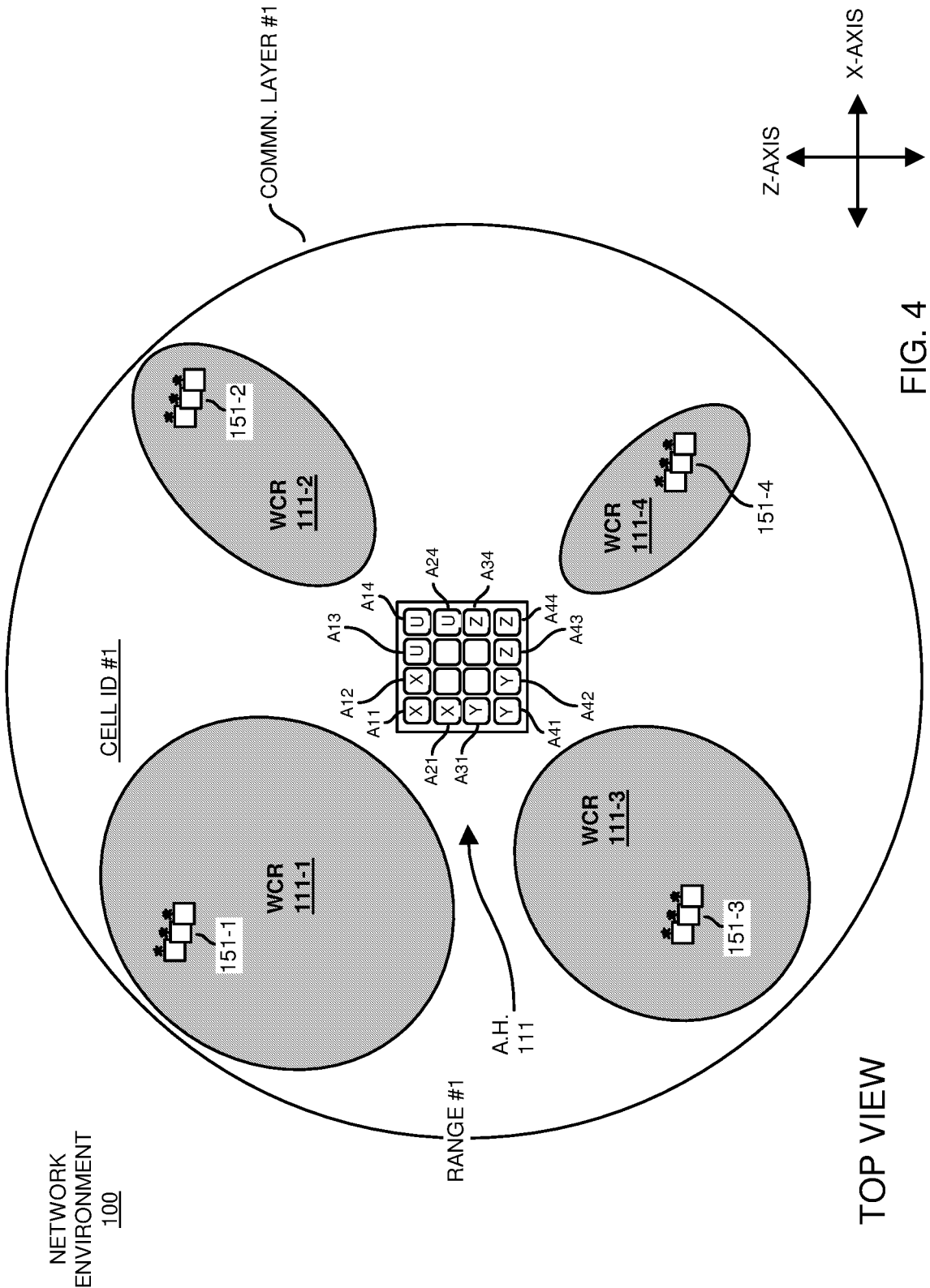
FIG. 4 is an example diagram illustrating the dynamic variability of controlling wireless coverage at a first communication layer (first tier) of a multi-tier wireless base station according to embodiments herein.

FIG. 4 is an example diagram illustrating wireless coverage provided by a first communication layer (first tier) of a multi-tier wireless base station according to embodiments herein.

In this embodiment, as previously discussed, the antenna hardware 111 includes an array of multiple antenna elements A11, A12, A13, A14, A21, A22, A23, A24, A31, A32, A33, A34, A41, A42, A43, A44. Note that the antenna hardware 111 can include any number of antenna elements. The antenna elements can be arranged in any suitable manner.

In accordance with further example embodiments in FIG. 4, the multi-tier wireless base station 131 increases (with respect to 2 sectors in FIG. 3) a number of sectors (wireless coverage regions) supported by the antenna hardware in response to detecting a condition such as that wireless connectivity (such as a so-called hot spot) is desired via communication devices 151-3 and communication devices 151-4.

For example, in one embodiment, the wireless base station 131 or other suitable resource selects a third portion of the antenna elements such as antenna element A31, A41, and A42 to provide beamforming in communication layer #1 and corresponding wireless coverage region 111-3 to support wireless communications to the communication devices 151-3; the wireless base station 131 or other suitable resource selects a fourth portion of the antenna elements such as antenna element A34, A44, and A43 to provide beamforming in communication layer #1 and corresponding wireless coverage region 111-2 to support wireless communications to the communication devices 151-4.

Thus, from an aerial view (i.e., top view looking down on the wireless base station 131), via the antenna hardware 111, the wireless base station 131 provides wireless connectivity in communication layer #1 to communication devices 151-1 via wireless coverage region 111-1; the wireless base station 131 provides wireless connectivity in communication layer #1 to communication devices 151-2 via wireless coverage region 111-2; the wireless base station 131 provides wireless connectivity in communication layer #1 to communication devices 151-3 via wireless coverage region 111-3; the wireless base station 131 provides wireless connectivity in communication layer #1 to communication devices 151-4 via wireless coverage region 111-4.

In addition to increasing a number of sectors in the communication layer #1 supporting wireless connectivity, the wireless base station 131 has the ability to change angular coverage provided by each of the wireless coverage regions. More specifically, in this example embodiment, the wireless base station 131 increases an angular width and corresponding coverage associated with wireless coverage region 111-1 (from FIG. 3 to FIG. 4). The wireless base station 131 also can decrease a respective beam-width of reach a respective wireless coverage region.

In yet further example embodiments, the wireless base station 131 controls a power level at which wireless signals are transmitted from each grouping of antenna elements in the antenna hardware 111 to control a range in which the transmitted wireless signals travel in the network environment 100. Thus, increasing a power level of transmitting the wireless signals increases a region of wireless coverage supported by the wireless base station for the corresponding sector.

In one embodiment, the wireless base station 131 is limited as to the maximum power level at which signals are transmitted in each communication layer for each allocated carrier frequency. For example, the wireless base station 131 may be allocated wireless channel #1 to provide connectivity via the first communication layer #1. The wireless base station 131 may be limited to transmitting wireless signals from the antenna hardware 111 at a power level of Ptotal (such as maximum wireless signal transmission power or so-called Equivalent Isotropically Radiated Power or EIRP).

In one embodiment, in accordance with the maximum power level allowed, the wireless base station 131 transmits (via wireless signals over the first carrier frequency) at a wireless power level P1 from the group of antenna elements A21, A11, and A12 to produce wireless coverage region 111-1; the wireless base station 131 transmits (via wireless signals over the first carrier frequency) at a wireless power level P2 from the group of antenna elements A13, A14, and A24 to produce wireless coverage region 111-2; the wireless base station 131 transmits (via wireless signals over the first carrier frequency) at a wireless power level P3 from the group of antenna elements A31, A41, and A42 to produce wireless coverage region 111-3; the wireless base station 131 transmits (via wireless signals over the first carrier frequency) at a wireless power level P4 from the group of antenna elements A43, A44, and A34 to produce wireless coverage region 111-4.

In one embodiment, the summation of power P1, P2, P3, and P4 associated with communicating via the first carrier frequency is less than or equal to maximum allowable wireless power transmit level, Ptotal (such as Equivalent Isotropically Radiated Power or EIRP), for the corresponding communication layer #1.

As further discussed below, the first carrier frequency can be assigned to each of one or more other communication layers such as communication layer #2, communication layer #3, etc. Based on a spacing of the antenna hardware, and because there is no correlation between transmitted wireless signals at different communication layers, the summation of power at which the wireless base station 131 communicates in each of the other communication layers via the first carrier frequency is up to the maximum power transmit level, Ptotal (such as Equivalent Isotropically Radiated Power or EIRP). Thus, certain embodiments herein include reuse of the same carrier frequency at different communication layers to provide wireless connectivity in the network environment 100.

Figure 5:
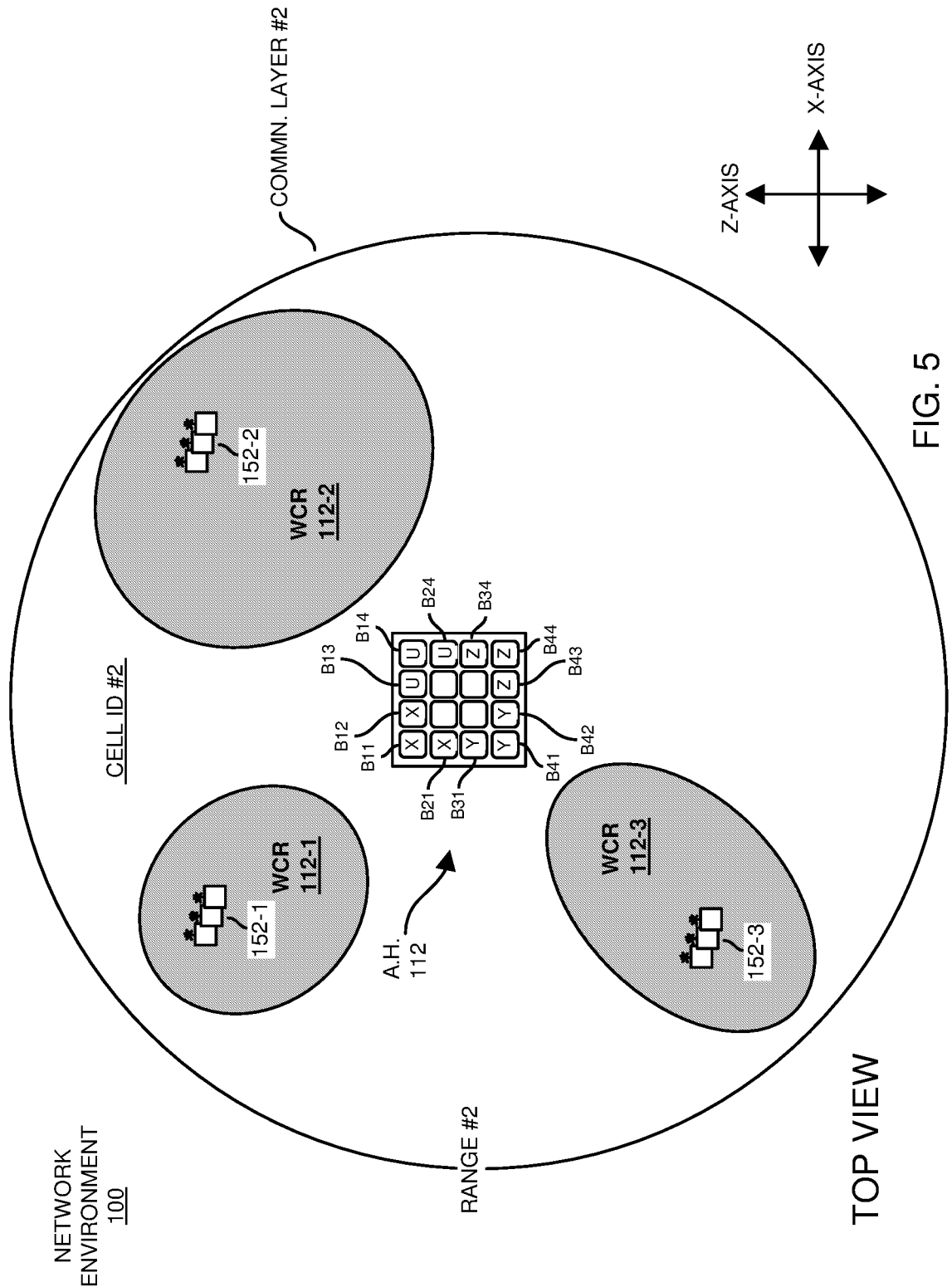
FIG. 5 is an example diagram illustrating wireless coverage provided by a second communication layer (second tier) of a multi-tier wireless base station according to embodiments herein.

FIG. 5 is an example diagram illustrating wireless coverage provided by a second communication layer (second tier) of a multi-tier wireless base station according to embodiments herein.

In this embodiment, the antenna hardware 112 includes an array of multiple antenna elements B11, B12, B13, B14, B21, B22, B23, B24, B31, B32, B33, B34, B41, B42, B43, B44. Note that the antenna hardware 112 can include any number of antenna elements. The antenna elements can be arranged in any suitable manner.

In one embodiment, the antenna elements are arranged along as multiple parallel antenna elements along the same axis as shown. Alternatively, the antenna elements are arranged in a different pattern.

Antenna elements associated with each instance of respective antenna hardware can be any suitable type of devices. For example, in one embodiment, the antenna elements represent devices such as a dipole antenna or other suitable transceiver (transmitter or receiver) resource.

In accordance with further example embodiments, the multi-tier wireless base station 131 controls a number of sectors supported by the antenna hardware 112 of communication layer #2. For example, in one embodiment, the wireless base station 131 or other suitable resource selects a first portion of the antenna elements such as antenna element B21, B11, and B12 to provide beamforming in communication layer #2 and corresponding wireless coverage region 112-1; the wireless base station 131 or other suitable resource selects a second portion of the antenna elements such as antenna element B13, B14, and B24 to provide beamforming in communication layer #2 and corresponding wireless coverage region 112-2; the wireless base station 131 or other suitable resource selects a second portion of the antenna elements such as antenna element B31, B41, and B42 to provide beamforming in communication layer #3 and corresponding wireless coverage region 112-3.

Thus, from an aerial view (i.e., top view looking down on the wireless base station 131), the wireless base station 131 provides wireless connectivity in communication layer #2 to communication devices 152-1 via wireless coverage region 112-1; the wireless base station 131 provides wireless connectivity in communication layer #2 to communication devices 152-2 via wireless coverage region 112-2; the wireless base station 131 provides wireless connectivity in communication layer #2 to communication devices 152-3 via wireless coverage region 112-3.

Note further that the wireless base station 131 can be configured to dynamically change the region of wireless coverage provided by selected groupings of antenna elements in the antenna hardware 111. For example, in response to detecting a need for additional coverage via communication layer #1 to communication devices, the wireless base station 131 implements one or more additional regions of wireless coverage.

As previously discussed, the wireless base station 131 can be configured to modify the number of sectors (i.e., different wireless coverage regions) depending on a load of corresponding communication devices that need to be provided wireless access/connectivity. For example, the wireless base station 131 can be configured to increase or decrease the number of sectors in communication layer #2 as needed.

Figure 6:
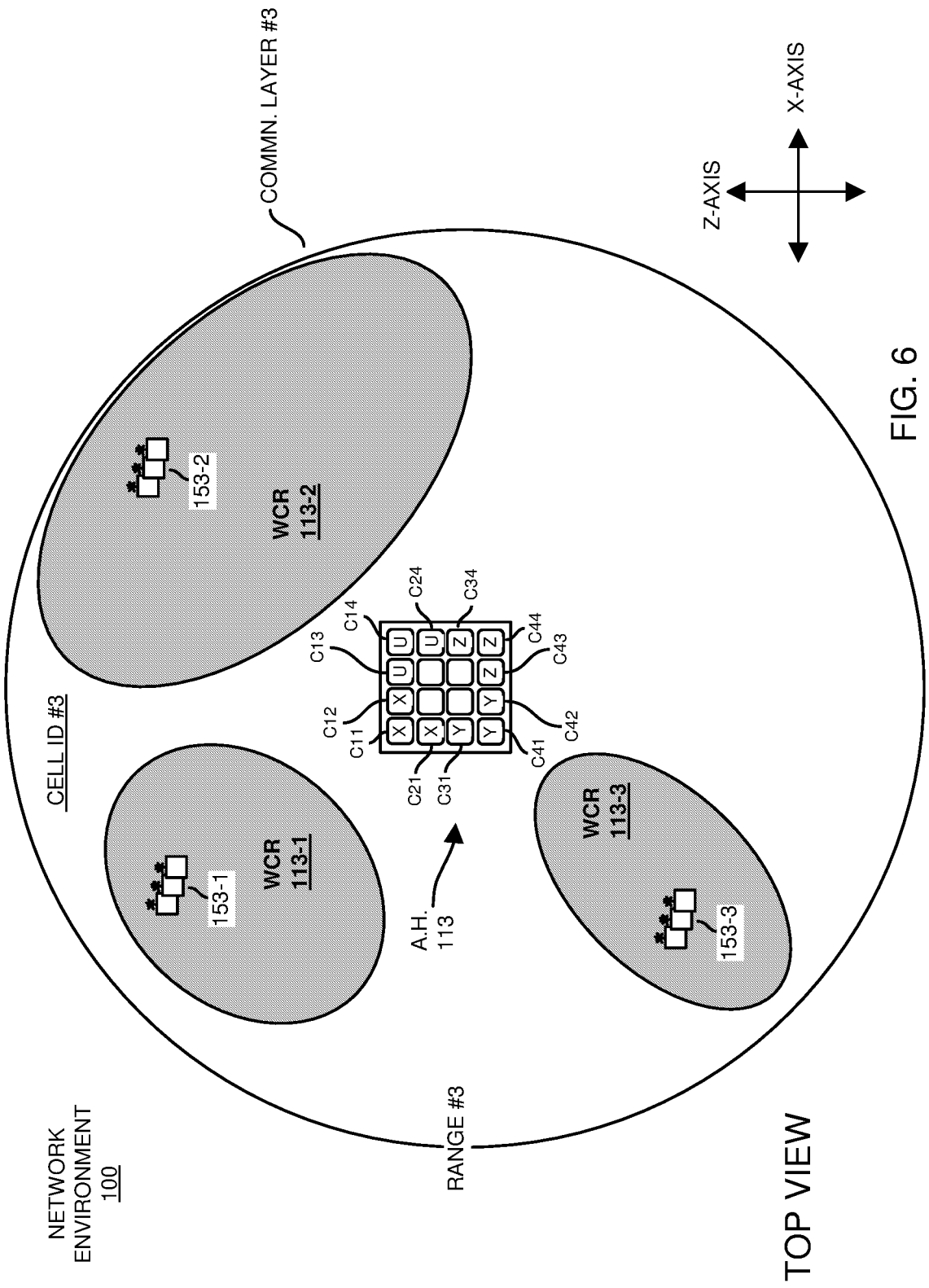
FIG. 6 is an example diagram illustrating wireless coverage provided by a third communication layer (third tier) of a multi-tier wireless base station according to embodiments herein.

FIG. 6 is an example diagram illustrating wireless coverage provided by a third communication layer (third tier) of a multi-tier wireless base station according to embodiments herein.

In this embodiment, the antenna hardware 113 includes an array of multiple antenna elements C11, C12, C13, C14, C21, C22, C23, C24, C31, C32, C33, C34, C41, C42, C43, C44. Note that the antenna hardware 113 can include any number of antenna elements. The antenna elements can be arranged in any suitable manner.

In one embodiment, the antenna elements are arranged along as multiple parallel antenna elements along the same axis as shown. Alternatively, the antenna elements are arranged in a different pattern.

Antenna elements associated with each instance of respective antenna hardware can be any suitable type of devices. For example, in one embodiment, the antenna elements represent devices such as a dipole antenna or other suitable transceiver (transmitter or receiver) resource.

In accordance with further example embodiments, the multi-tier wireless base station 131 controls a number of sectors supported by the antenna hardware 113 in communication layer #3.

For example, in one embodiment, the wireless base station 131 or other suitable resource selects a first portion of the antenna elements such as antenna element C21, C11, and C12 to provide beamforming in communication layer #3 and corresponding wireless coverage region 113-1; the wireless base station 131 or other suitable resource selects a second portion of the antenna elements such as antenna element C13, C14, and C24 to provide beamforming in communication layer #3 and corresponding wireless coverage region 113-2; the wireless base station 131 or other suitable resource selects a second portion of the antenna elements such as antenna element C31, C41, and C42 to provide beamforming in communication layer #3 and corresponding wireless coverage region 113-3.

Thus, from an aerial view (i.e., top view looking down on the wireless base station 131), via antenna hardware 113 the wireless base station 131 provides wireless connectivity in communication layer #3 to communication devices 153-1 via wireless coverage region 113-1; the wireless base station 131 provides wireless connectivity in communication layer #3 to communication devices 153-2 via wireless coverage region 113-2; the wireless base station 131 provides wireless connectivity in communication layer #3 to communication devices 153-3 via wireless coverage region 113-3.

As previously discussed, the wireless base station 131 can be configured to dynamically change the region of wireless coverage provided by selected groupings of antenna elements in the antenna hardware 113. For example, in response to detecting a need for additional coverage via communication layer #3 to communication devices, the wireless base station 131 implements additional region of wireless coverage.

As previously discussed, the wireless base station 131 can be configured to modify the number of sectors (i.e., different wireless coverage regions) depending on a load of corresponding communication devices that need to be provided wireless access/connectivity. For example, the wireless base station 131 can be configured to increase or decrease the number of sectors in communication layer #3.

Figure 7:
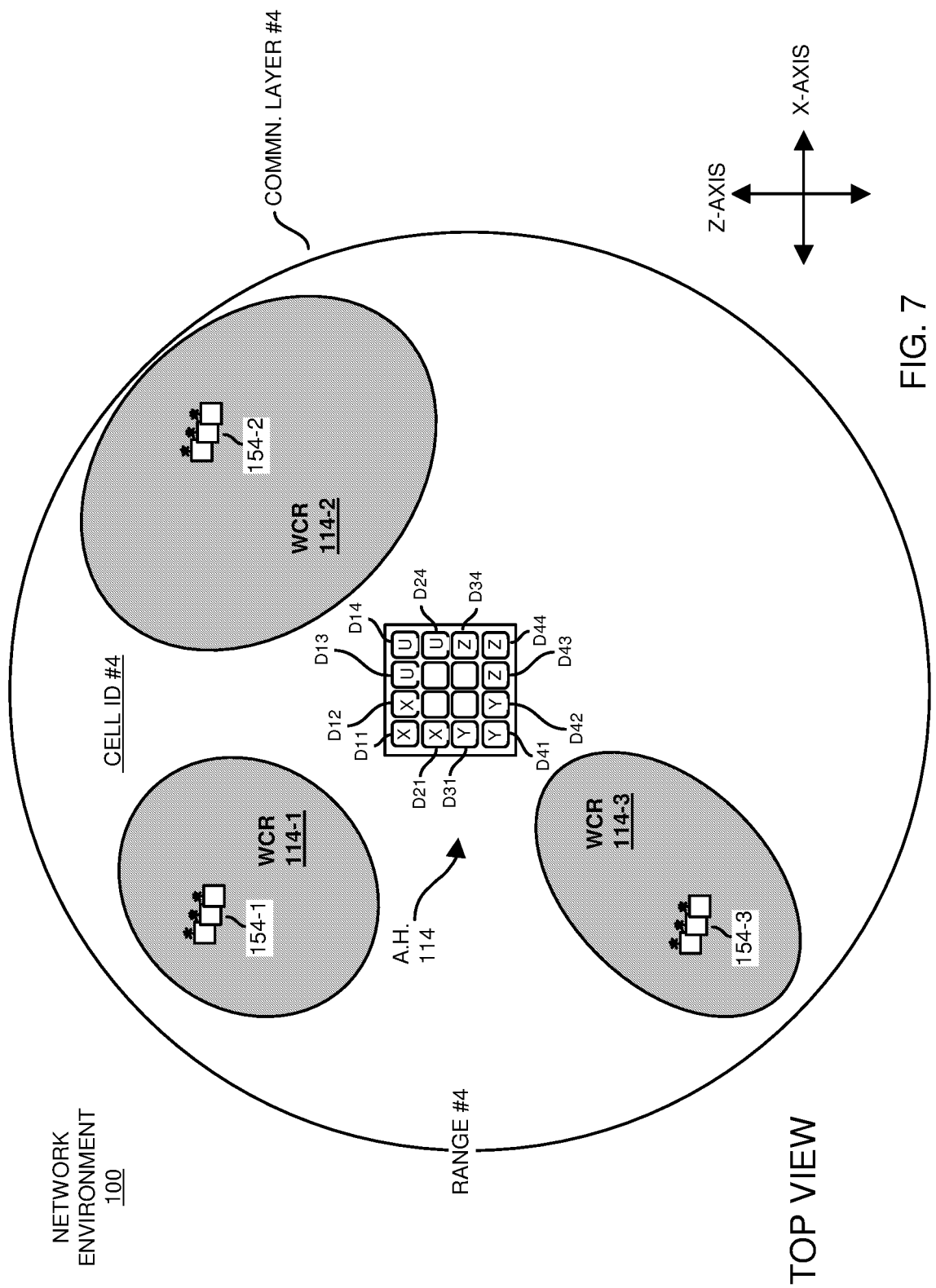
FIG. 7 is an example diagram illustrating wireless coverage provided by a fourth communication layer (fourth tier) of a multi-tier wireless base station according to embodiments herein.

FIG. 7 is an example diagram illustrating wireless coverage provided by a fourth communication layer (fourth tier) of a multi-tier wireless base station according to embodiments herein.

In this embodiment, the antenna hardware 113 includes an array of multiple antenna elements D11, D12, D13, D14, D21, D22, D23, D24, D31, D32, D33, D34, D41, D42, D43, D44. Note that the antenna hardware 113 can include any number of antenna elements. The antenna elements can be arranged in any suitable manner.

In one embodiment, the antenna elements are arranged along as multiple parallel antenna elements along the same axis as shown. Alternatively, the antenna elements are arranged in a different pattern.

Antenna elements associated with each instance of respective antenna hardware can be any suitable type of devices. For example, in one embodiment, the antenna elements represent devices such as a dipole antenna or other suitable transceiver (transmitter or receiver) resource.

In accordance with further example embodiments, the multi-tier wireless base station 131 controls a number of sectors supported by the antenna hardware 113. For example, in one embodiment, the wireless base station 131 or other suitable resource selects a first portion of the antenna elements such as antenna element D21, D11, and D12 to provide beamforming in communication layer #4 and corresponding wireless coverage region 114-1; the wireless base station 131 or other suitable resource selects a second portion of the antenna elements such as antenna element D13, D14, and D24 to provide beamforming in communication layer #4 and corresponding wireless coverage region 114-2; the wireless base station 131 or other suitable resource selects a second portion of the antenna elements such as antenna element D31, D41, and D42 to provide beamforming in communication layer #4 and corresponding wireless coverage region 114-3.

Thus, from an aerial view (i.e., top view looking down on the wireless base station 131), the wireless base station 131 provides wireless connectivity in communication layer #4 to communication devices 154-1 via wireless coverage region 113-1; the wireless base station 131 provides wireless connectivity in communication layer #4 to communication devices 154-2 via wireless coverage region 114-2; the wireless base station 131 provides wireless connectivity in communication layer #4 to communication devices 154-3 via wireless coverage region 114-3.

As previously discussed, the wireless base station 131 can be configured to dynamically change the region of wireless coverage provided by selected groupings of antenna elements in the antenna hardware 113. For example, in response to detecting a need for additional coverage via communication layer #4 to communication devices, the wireless base station 131 implements one or more additional regions of wireless coverage.

As previously discussed, the wireless base station 131 can be configured to modify the number of sectors (i.e., different wireless coverage regions) depending on a load of corresponding communication devices that need to be provided wireless access/connectivity. For example, the wireless base station 131 can be configured to increase or decrease the number of sectors in communication layer #4.

Figure 8:
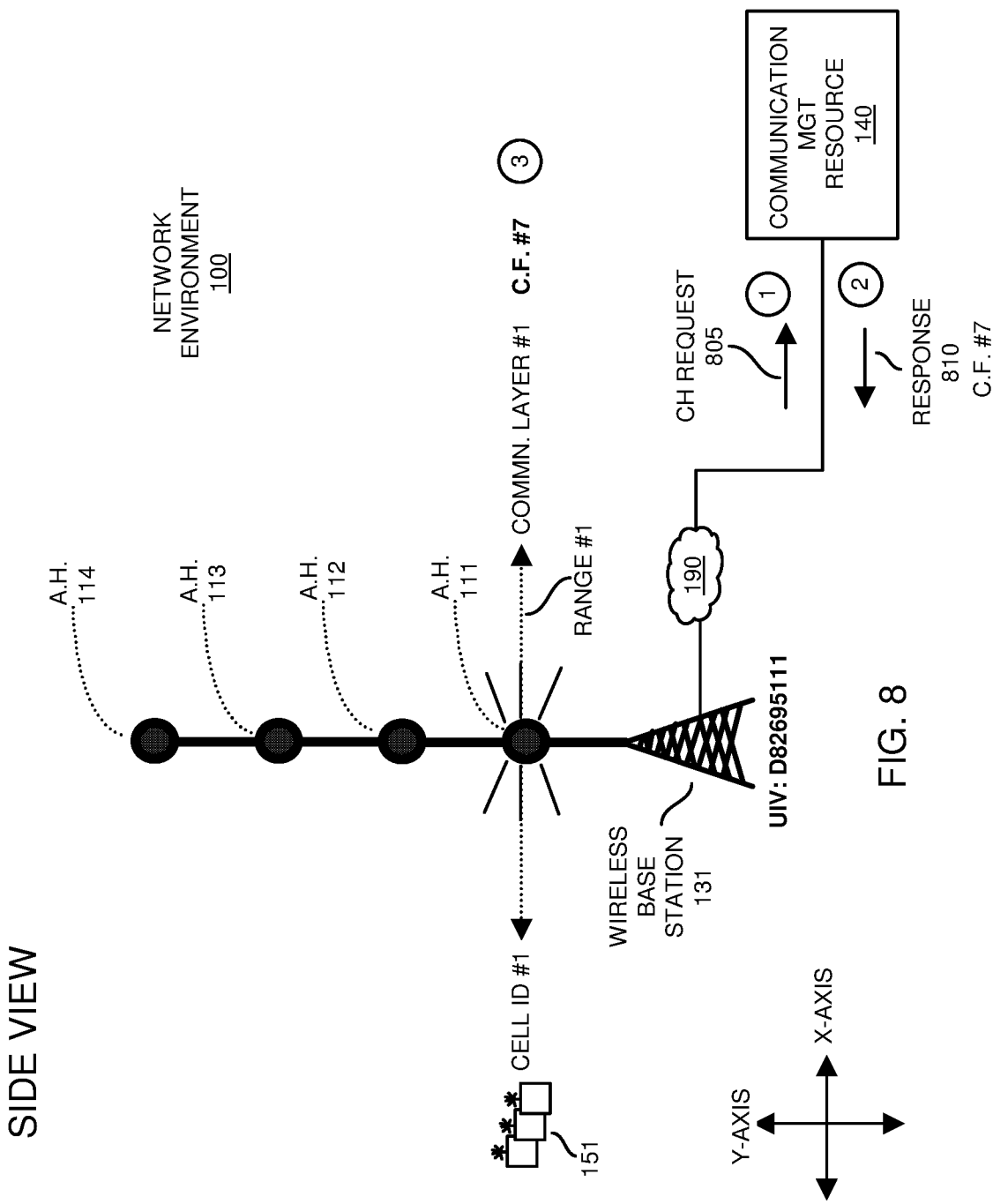
FIG. 8 is an example diagram illustrating allocation and use of wireless bandwidth at a first tier of a multi-tier wireless base station according to embodiments herein.

FIG. 8 is an example diagram illustrating allocation and use of wireless bandwidth at a first tier of a multi-tier wireless base station according to embodiments herein.

In this example embodiment, in furtherance of providing wireless connectivity via communication layer #1, via communications over the network 190, the wireless base station 131 registers with the communication management resource for allocation of one or more wireless channels (such as from a tiered hierarchy). Subsequent to registration, the wireless base station 131 communicates a channel request message 805 to the communication management resource 140. The channel request message 805 indicates that the wireless base station 131 would like to be allocated one or more wireless channels for use in the network environment 100. In one embodiment, a wireless channel is an amount of spectrum assigned to the wireless base station 131 (such as CBSD). For instance, every 10 or 20 MHz (or other suitable value) of assigned channel can be considered as one wireless channel.

In response to receiving the channel request 805, the communication management resource 140 allocates a respective wireless channel (carrier frequency #7 or first wireless channel) to the wireless base station 131 for use in the network environment 100.

Via the newly assigned wireless channel #7 (such as at carrier frequency #7), in a manner as previously discussed, the wireless base station establishes the communication layer #1 (assigned unique cell identifier #1) and provides wireless connectivity to communication devices 151.

In accordance with further example embodiments, the wireless base station 131 monitors the load (for example, an amount of wireless data communicated in the communication layer #1 between the wireless base station 131 and the communication devices 151). In response to detecting congestion, or that the wireless base station 131 is unable to provide sufficient wireless throughput to support the communication devices 151, or that the wireless base station needs to provide coverage to additional communication devices, the wireless base station 131 requests allocation of additional channels as further discussed in FIG. 9.

Figure 9:
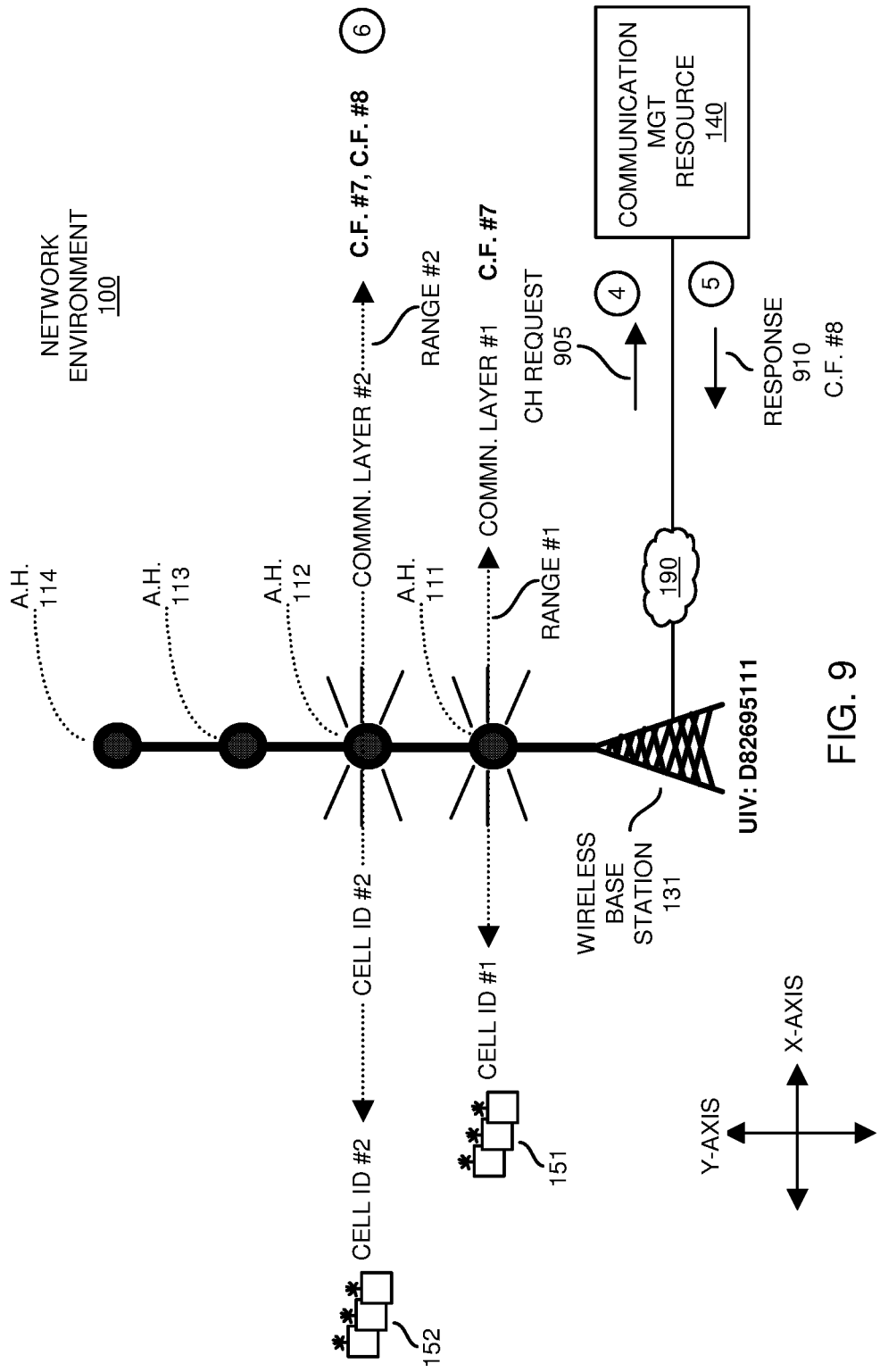
FIG. 9 is an example diagram illustrating expanded allocation and use of wireless bandwidth at a first tier and a second tier of a multi-tier wireless base station according to embodiments herein.

FIG. 9 is an example diagram illustrating expanded allocation and use of wireless bandwidth at a first tier and a second tier of a multi-tier wireless base station according to embodiments herein.

As previously discussed, the multi-tier wireless base station 131 can be configured to dynamically adjust a number of communication layers implemented by the wireless base station to provide wireless connectivity.

For example, yet further embodiments herein include, via the wireless base station 131, providing first wireless connectivity to communication devices 151 via communication layer #1. In response to detecting a need to support additional communication devices in the network environment 100 such as communication devices 152, the wireless base station 131 expands operations to include implementation of communication layer #2.

In one embodiment, in furtherance of providing additional wireless connectivity to communication devices in the network environment 100, and in response to detecting a heavy wireless usage by communication devices or a need to support additional communication devices or provide higher wireless bandwidth, the wireless base station 131 communicates channel request 905 to the communication management resource 140. The channel request message 905 indicates that the wireless base station 131 would like to be allocated one or more additional wireless channels for use in the network environment 100.

In response to receiving the channel request 905, the communication management resource 140 allocates a respective wireless channel #8 (carrier frequency #8) to the wireless base station 131 for use in the network environment 100. The wireless base station 131 is now allocated wireless channels #7 and #8.

Via the newly allocated wireless channel #8 and previously allocated wireless channel #7, in a manner as previously discussed, the wireless base station 131 establishes the communication layer #2 and provides wireless connectivity to communication devices 152 using wireless channel #7 and #8.

Thus, further embodiments herein include, via the wireless base station 131: i) receiving an identity of a second wireless channel (such as carrier frequency #8) allocated to the wireless base station 131; ii) continuing to implement the communication layer #1 via first communications from first antenna hardware 111 of the wireless base station 131 to the first wireless communication devices 151 using the first wireless channel (such as carrier frequency #7); and iii) establishing (implementing) the second communication layer #2 via communications from second antenna hardware 112 of the wireless base station 131 to the second wireless communication devices 152 using the wireless channels #7 and/or #8.

In accordance with further example embodiments, if no additional bandwidth is needed for communication layer #2, the wireless base station 131 can be configured to implement the previously allocated wireless channel #7 in communication layer #2 without requesting any additional wireless channels.

Thus, in one embodiment, because the wireless channel #7 already has been allocated for use by the communication management resource 140, the wireless base station 131 supports communications in the communication layer #2 via wireless channel #7 (carrier frequency #7) as well as potentially the newly allocated wireless channel #8 (carrier frequency #8).

In accordance with further example embodiments, the wireless base station 131 further monitors the load (for example, an amount of wireless data communicated in the communication layer #1 and communication layer #2 between the wireless base station 131 and the communication devices 151 and 152). Implementation of the communication layers #1 and #2 may not provide sufficient wireless bandwidth to corresponding communication devices. The wireless base station 131 may also detect a need to provide wireless coverage in another communication layer.

In response to detecting congestion, or that the wireless base station 131 is unable to provide sufficient wireless throughput to support the communication devices 151 and 152, or other condition, the wireless base station 131 requests allocation of additional channels as further discussed in FIG. 9.

Figure 10:
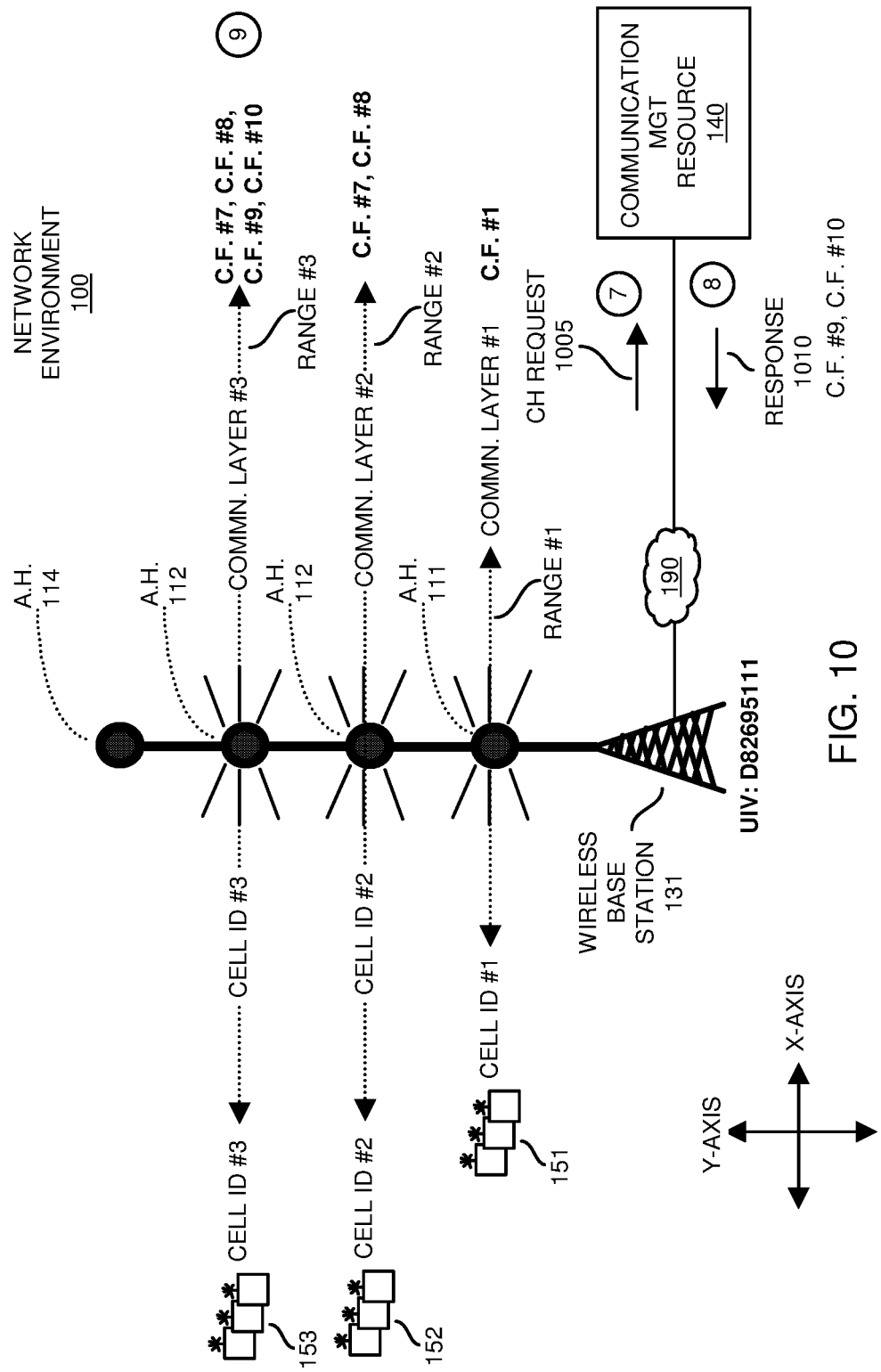
FIG. 10 is an example diagram illustrating expanded allocation and use of wireless bandwidth at three tiers of a multi-tier wireless base station according to embodiments herein.

FIG. 10 is an example diagram illustrating expanded allocation and use of wireless bandwidth at three tiers of a multi-tier wireless base station according to embodiments herein.

As previously discussed, the multi-tier wireless base station 131 can be configured to dynamically adjust a number of communication layers implemented by the wireless base station to provide wireless connectivity. For example, yet further embodiments herein include, via the wireless base station 131, providing first wireless connectivity to communication devices 151 via communication layer #1 and providing first wireless connectivity to communication devices 152 via communication layer #2. In response to detecting a need to support additional communication devices or additional wireless bandwidth in the network environment 100, the wireless base station 131 expands wireless connectivity operations to include implementation of communication layer #3.

In one embodiment, in furtherance of providing additional wireless connectivity to communication devices in the network environment 100 in response to detecting a heavy wireless usage by communication devices or a need to support additional communication devices or provide higher wireless bandwidth, the wireless base station 131 communicates channel request 1005 to the communication management resource 140. The channel request message 1005 indicates that the wireless base station 131 would like to be allocated one or more additional wireless channels for use in the network environment 100.

In response to receiving the channel request 1005, the communication management resource 140 allocates respective wireless channels #9 and #10 (carrier frequency #9 and #10) to the wireless base station 131 for use in the network environment 100. The wireless base station 131 is now allocated wireless channels #7, #8, #9, and #10.

Via the newly allocated wireless channel #8 and previously allocated wireless channels #7 and #8, in a manner as previously discussed, the wireless base station 131 establishes the communication layer #3 and provides wireless connectivity to communication devices 153 using wireless channel #7, #8, #9, and #10.

Thus, in one embodiment, because the wireless channels #7 and #8 already have been allocated for use by the communication management resource 140, the wireless base station 131 supports communications in the communication layer #3 via wireless channel #7 (carrier frequency #7), wireless channel #8 (carrier frequency #8) as well as newly assigned wireless channel #9 (carrier frequency #9) and wireless channel #10 (carrier frequency #10). If desired, the wireless base station 131 can be configured to implement communication layer #3 via wireless channels #7 and #8 without requesting new wireless channels.

In accordance with further example embodiments, the wireless base station 131 further monitors the load of communication devices supported by the wireless base station. In response to detecting that the load of communication devices supported by the wireless base station 131 decreases and that one or more communication layers or wireless channels are no longer needed, the wireless base station 131 discontinues implementing one or more wireless communication layers and one or more wireless channels and requests deallocation of one or more wireless channels for its use as in FIG. 11.

Figure 11:
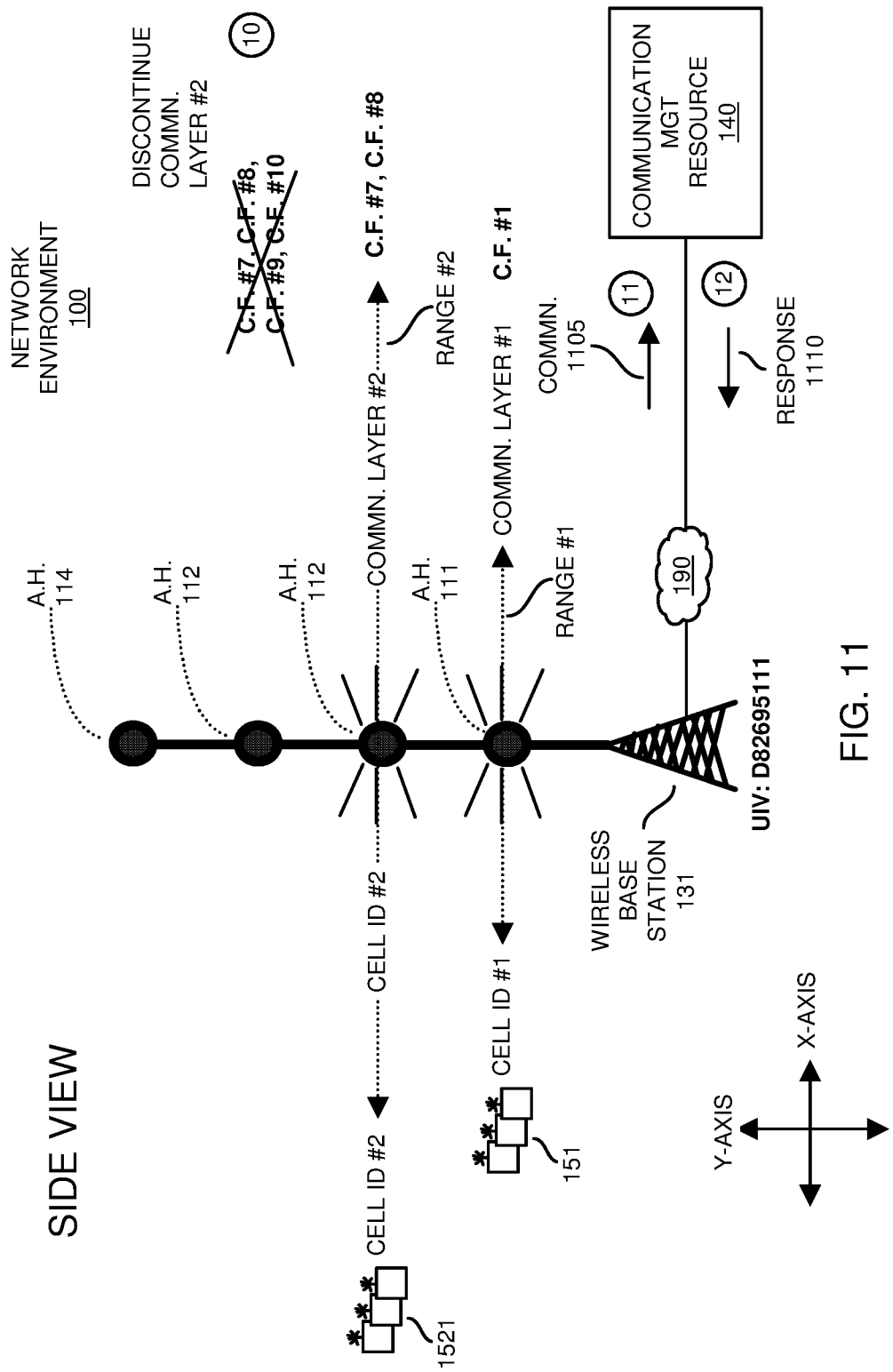
FIG. 11 is an example diagram illustrating contraction and use of wireless bandwidth at two tiers of a multi-tier wireless base station according to embodiments herein.

FIG. 11 is an example diagram illustrating contraction and use of wireless bandwidth at two tiers of a multi-tier wireless base station according to embodiments herein.

In response to detecting that communications transmitted from the communication layer #3 fall below a threshold value, the wireless base station (or other suitable entity) notifies the communication management resource 140 (channel allocation management resource) to deallocate the wireless channels #9 and #10 from the wireless base station 131. For example, the wireless base station 131 transmits communications 1105 requesting the deallocation. The communication management resource 140 deallocates use of the wireless channel #9 and #10 via response communications 1110 confirming the deallocation communicated to the wireless base station 131. In such an instance, the wireless channels #9 and #10 are not needlessly allocated to the wireless base station 131.

Figure 12:
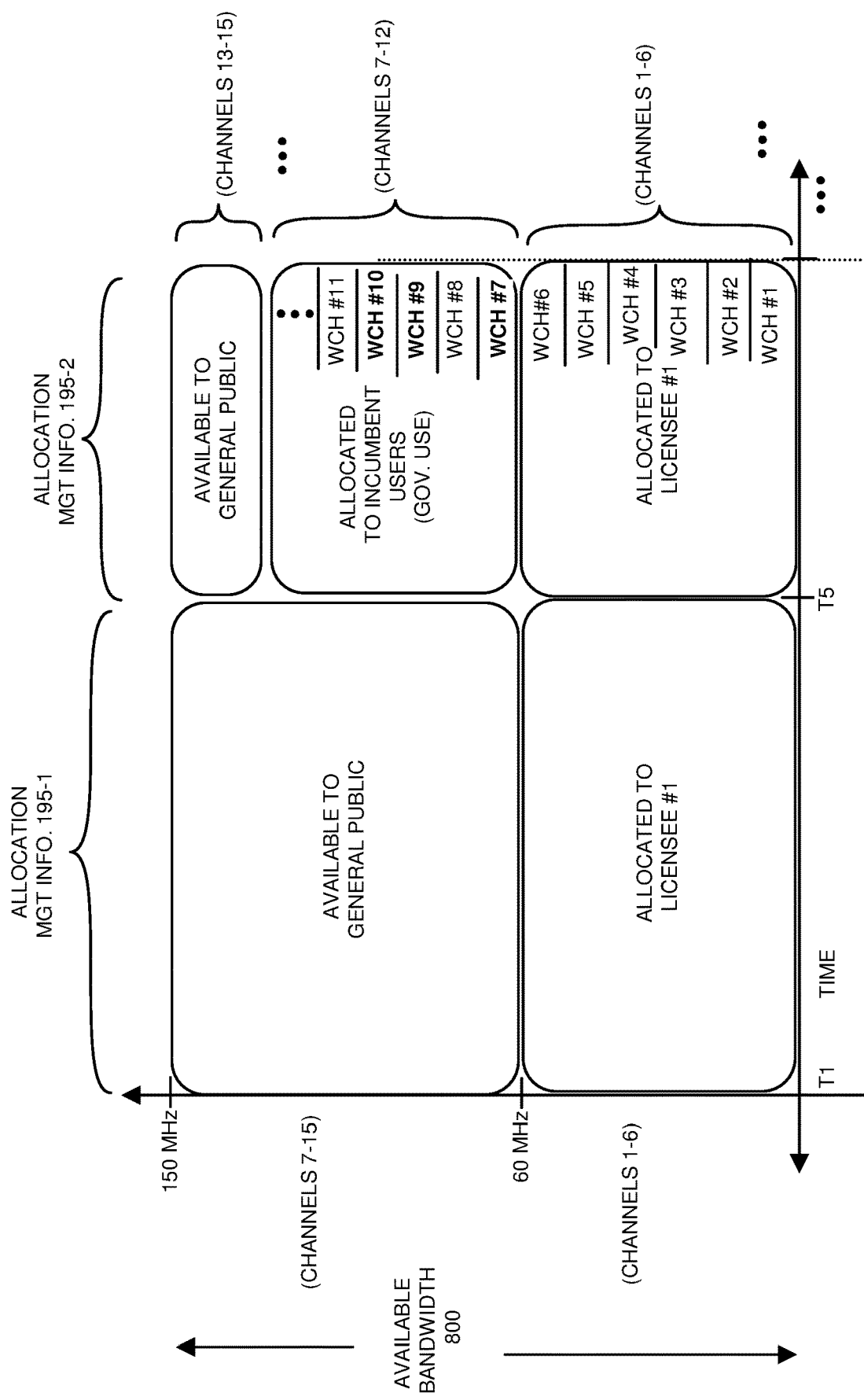
FIG. 12 is an example diagram illustrating a wireless spectrum from which wireless channels are allocated and deallocated according to embodiments herein.

FIG. 12 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, communication management resource 140 (such as spectrum access system, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 195-2 as shown in FIG. 12.

More specifically, in this example, the allocation management information 195-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 195-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices 151, 152, 153, via respective communication layers #1, #2, and #3 and corresponding connectivity to the remote network 190. At or around time T5, the communication management resource 140 deallocates use of the wireless channels #7, #8, #9 and #10 from the wireless base station 131 in favor of use of those wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

Figure 13:
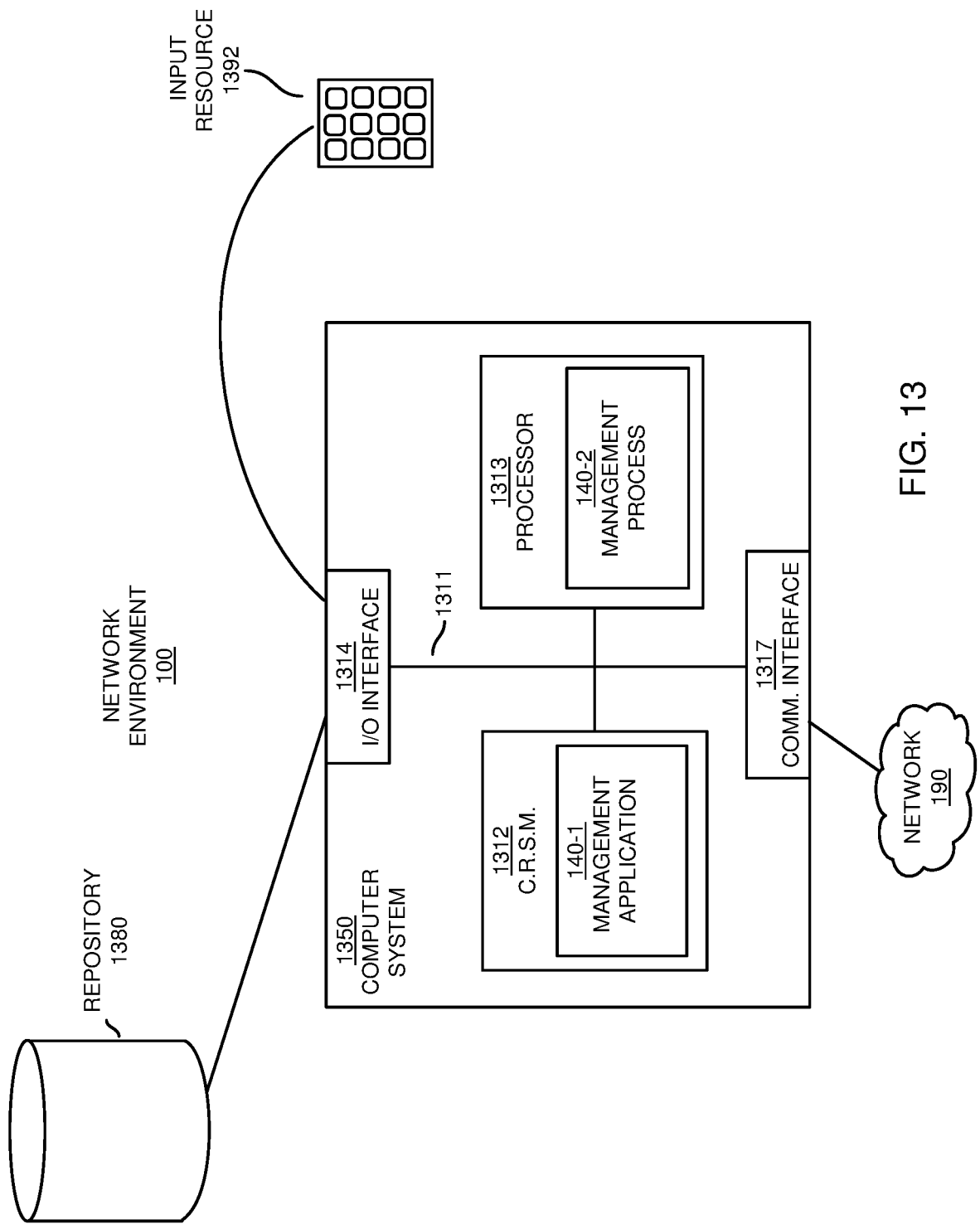
FIG. 13 is an example diagram illustrating example computer architecture operable to execute one or more operations according to embodiments herein.

FIG. 13 is an example block diagram of a computer system for implementing any of the operations as discussed herein according to embodiments herein.

Any of the resources (such as communication management resource 140, wireless base station 131, etc.) as discussed herein can be configured to include a respective instantiation of computer processor hardware and corresponding executable instructions to carry out the different operations as discussed herein. For example, communication management resource 140 can be configured to execute the management application 140-1 to execute operations associated with the communication management resource 140; multi-tier wireless base station 131 can be configured to execute the management application 140-1 to execute operations associated with the multi-tier wireless base station 131, etc.

As shown, computer system 1350 of the present example includes an interconnect 1311 that couples computer readable storage media 1312 such as a non-transitory type of media (i.e., any type of hardware storage medium) from which digital information is stored and retrieved, a processor 1313, I/O interface 1314, and a communications interface 1317.

I/O interface 1314 supports connectivity to repository 1380 and input resource 1392.

Computer readable storage medium 1312 can be any hardware storage device such as memory, optical storage, hard drive, floppy disk, etc. In one embodiment, the computer readable storage medium 1312 stores instructions and/or data.

As shown, computer readable storage media 1312 can be encoded with management application 140-1 (e.g., including instructions) to carry out any of the operations as discussed herein.

During operation of one embodiment, processor 1313 accesses computer readable storage media 1312 via the use of interconnect 1311 in order to launch, run, execute, interpret or otherwise perform the instructions in management application 140-1 stored on computer readable storage medium 1312. Execution of the management application 140-1 produces management process 140-2 to carry out any of the operations and/or processes as discussed herein.

Those skilled in the art will understand that the computer system 1350 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 14. Note that the steps in the flowcharts below can be executed in any suitable order.

Figure 14:
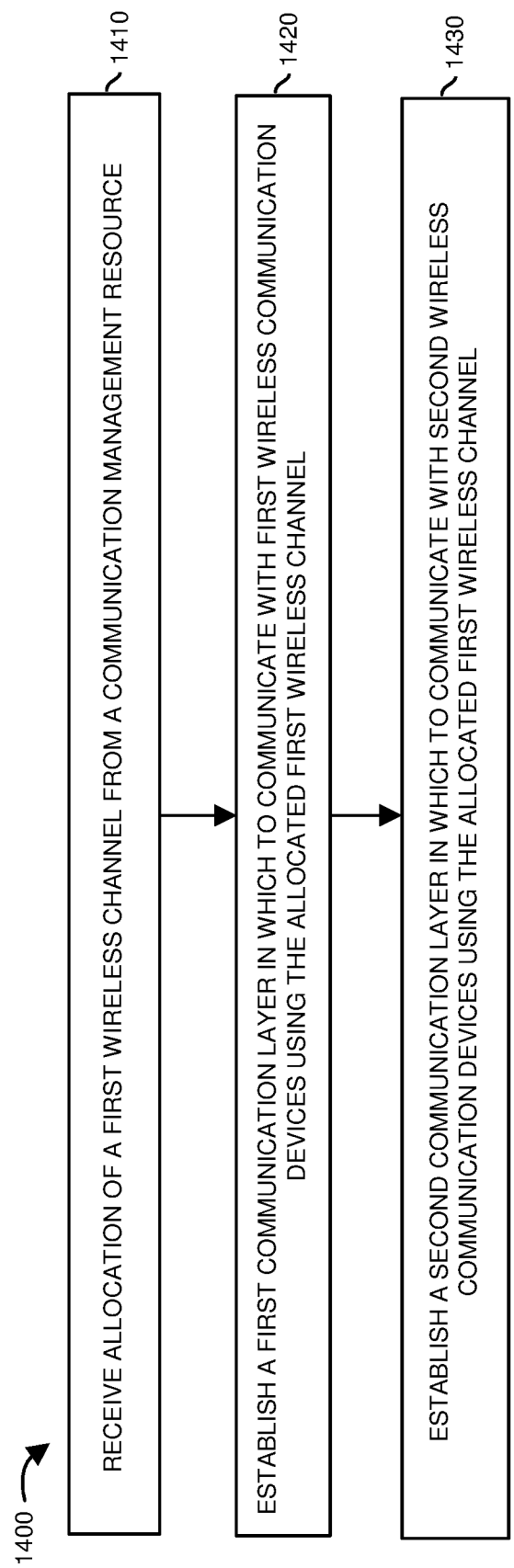
FIG. 14 is an example diagram illustrating a method according to embodiments herein.

FIG. 14 is a flowchart 1400 illustrating an example method according to embodiments. Note that there will be some overlap with respect to concepts as discussed above.

In processing operation 1410, the wireless base station 131 (such as a multi-tier wireless base station) receives allocation of a first wireless channel (such as wireless channel #7) from a communication management resource 140.

In processing operation 1420, the wireless base station 131 establishes communication layer #1 in which to communicate with first wireless communication devices 151 using the allocated first wireless channel (wireless channel #7).

In processing operation 1430, the wireless base station 131 establishes communication layer #2 in which to communicate with second wireless communication devices 152 using the allocated first wireless channel (wireless channel #7).

Note again that techniques herein are well suited to support communications in a wireless network environment via manage allocation of wireless channels in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving allocation of a first wireless channel from a communication management resource;
via a wireless base station in communication with a remote network:
  i) establishing a first communication layer in which to communicate with first wireless communication devices using the allocated first wireless channel;
  ii) depending on a load of the first communication layer communicating data, establishing a second communication layer in which to communicate with second wireless communication devices using the allocated first wireless channel;
wherein the first communication layer is supported via first antenna hardware disposed at a first height of the wireless base station; and
wherein the second communication layer is implemented via second antenna hardware of the wireless base station, the second antenna hardware disposed at a second height of the wireless base station, the second height being greater than the first height.

2. The method as in claim 1 further comprising:
via the first communication layer at the wireless base station: communicating with the first communication devices via first wireless communications; and
via the second communication layer at the wireless base station: communicating with the second communication devices via second wireless communications, the second wireless communications uncorrelated with the first wireless communications.

3. The method as in claim 1, wherein the first wireless channel is allocated from a tiered wireless communication hierarchy in which an incumbent user is ranked higher in priority than the wireless base station.

4. The method as in claim 1 further comprising:
monitoring bandwidth usage of the first communication layer by the first wireless communication devices; and
establishing the second communication layer in response to detecting that the bandwidth usage of the first communication layer is above a threshold value.

5. The method as in claim 1 further comprising:
establishing the second communication layer at the wireless base station in response to detecting that a magnitude of the load of the first communication layer communicating the data is above a threshold level.

6. The method as in claim 5, wherein establishing the second communication layer includes:
in response to communicating a request for additional bandwidth from the wireless base station to the communication management resource, receiving allocation of a second wireless channel; and
implementing the second communication layer to communicate with the second wireless communication devices via the first wireless channel and the second wireless channel.

7. A method comprising:
receiving allocation of a first wireless channel from a communication management resource;
via a wireless base station in communication with a remote network:
  i) establishing a first communication layer in which to communicate with first wireless communication devices using the allocated first wireless channel;
  ii) depending on a load of the first communication layer communicating data, establishing a second communication layer in which to communicate with second wireless communication devices using the allocated first wireless channel,
the method further comprising:
  operating first antenna hardware at a first height of the wireless base station to establish the first communication layer and communicate with the first wireless communication devices;
  operating second antenna hardware at a second height of the wireless base station to establish the second communication layer and communicate with the second wireless communication devices; and
  wherein the first antenna hardware and the second antenna hardware in the wireless base station are vertically spaced apart from each other by a spacing.

8. The method as in claim 7, wherein the spacing between the first antenna hardware and the second antenna hardware is greater than a threshold value, the threshold value sufficiently large to prevent correlation of first wireless signals from the first antenna hardware and second wireless signals from the second antenna hardware.

9. The method as in claim 2 further comprising:
via the first antenna hardware, wirelessly transmitting a first notification indicating availability of the first communication layer, the first notification including a first cell identity value assigned to the first communication layer; and
via the second antenna hardware, wirelessly transmitting a second notification indicating availability of the second communication layer, the second notification including a second cell identity value assigned to the second communication layer.

10. The method as in claim 9, wherein a distance in height between first antenna hardware of the wireless base station supporting the first communication layer and second antenna hardware of the wireless base station supporting the second communication layer is greater than half a wavelength of a carrier frequency of the first wireless channel.

11. A method comprising:
receiving allocation of a first wireless channel from a communication management resource;
via a wireless base station in communication with a remote network:
  i) establishing a first communication layer in which to communicate with first wireless communication devices using the allocated first wireless channel;
  ii) depending on a load of the first communication layer communicating data, establishing a second communication layer in which to communicate with second wireless communication devices using the allocated first wireless channel,
the method further comprising:
  communicating from first antenna hardware over the first communication layer to the first communication devices; and
  communicating from second antenna hardware over the second communication layer to the second communication devices, the second antenna hardware physically separated from the first antenna hardware by a distance value greater than a threshold value depending on a carrier frequency of the allocated first wireless channel.

12. A method comprising:
receiving allocation of a first wireless channel from a communication management resource;
via a wireless base station in communication with a remote network:
  i) establishing a first communication layer in which to communicate with first wireless communication devices using the allocated first wireless channel;
  ii) depending on a load of the first communication layer communicating data, establishing a second communication layer in which to communicate with second wireless communication devices using the allocated first wireless channel, the method further comprising:
  receiving an identity of a second wireless channel allocated to the wireless base station;
  implementing the first communication layer via first communications from first antenna hardware of the wireless base station to the first wireless communication devices using the first wireless channel; and
  implementing the second communication layer via second communications from second antenna hardware of the wireless base station to the second wireless communication devices using the second wireless channel.

13. The method as in claim 12 further comprising:
implementing the second communication layer via third communications from the second antenna hardware of the wireless base station to the second wireless communication devices using the first wireless channel.

14. The method as in claim 13 further comprising:
in response to detecting that communications transmitted from the second communication layer fall below a threshold value, notifying the communication management resource to deallocate the second wireless channel from the wireless base station.

15. A method comprising:
receiving allocation of a first wireless channel from a communication management resource;
via a wireless base station in communication with a remote network:
  i) establishing a first communication layer in which to communicate with first wireless communication devices using the allocated first wireless channel;
  ii) depending on a load of the first communication layer communicating data, establishing a second communication layer in which to communicate with second wireless communication devices using the allocated first wireless channel, the method further comprising:
    partitioning the first communication layer into first spatially distinct sectors; and
    partitioning the second communication layer into second spatially distinct sectors.

16. The method as in claim 15 further comprising:
implementing use of the first wireless channel via simultaneous use of the first wireless channel in the first spatially distinct sectors and the second spatially distinct sectors.

17. The method as in claim 15, wherein the first communication layer is supported via first antenna hardware disposed at a first height of the wireless base station; and
wherein the second communication layer is implemented via second antenna hardware of the wireless base station disposed at a second height of the wireless base station, the second height greater than the first height of the first antenna hardware.

18. Computer-readable storage hardware having instructions stored thereon, the instructions, when carried out by computer processor hardware, cause the computer processor hardware to:
receive allocation of a first wireless channel from a communication management resource;
via a wireless base station in communication with a remote network:
  i) establish a first communication layer in which to communicate with first wireless communication devices using the allocated first wireless channel;
  ii) depending on a load of the first communication layer communicating data, establish a second communication layer in which to communicate with second wireless communication devices using the allocated first wireless channel; and
  wherein execution of the instructions further causes the computer processor hardware to: partition the first communication layer into first spatially distinct sectors; and partition the second communication layer into second spatially distinct sectors.

19. A system comprising:
a wireless base station, the wireless base station operative to:
  receive allocation of a first wireless channel from a communication management resource;
  establish a first communication layer in which to communicate with first wireless communication devices using the allocated first wireless channel;
  depending on a load of the first communication layer communicating data, establish a second communication layer in which to communicate with second wireless communication devices using the allocated first wireless channel; and
  wherein the wireless base station is further operative to:
    operate first antenna hardware of the wireless base station to establish the first communication layer and communicate with the first wireless communication devices;
    operate second antenna hardware of the wireless base station to establish the second communication layer and communicate with the second wireless communication devices; and
    wherein the first antenna hardware and the second antenna hardware in the wireless base station are vertically spaced apart from each other.

20. The system as in claim 19, wherein a spacing between the first antenna hardware and the second antenna hardware is greater than a threshold value, the threshold value sufficiently large to prevent correlation of first wireless signals from the first antenna hardware and second wireless signals from the second antenna hardware.

21. The system as in claim 19, wherein the wireless base station is further operative to:
via the first communication layer at the wireless base station: communicate with the first communication devices via first wireless communications; and
via the second communication layer at the wireless base station: communicate with the second communication devices via second wireless communications, the second wireless communications uncorrelated with the first wireless communications.

22. The system as in claim 19, wherein the wireless base station is further operative to:
communicate from first antenna hardware over the first communication layer to the first communication devices; and
communicate from second antenna hardware over the second communication layer to the second communication devices, the second antenna hardware physically separated from the first antenna hardware by a distance value above a threshold value depending on a carrier frequency of the allocated first wireless channel.

23. The system as in claim 19, wherein the first wireless channel is allocated from a tiered wireless communication hierarchy in which an incumbent user is ranked higher in priority than the wireless base station.

24. The system as in claim 19, wherein the wireless base station is further operative to:
monitor bandwidth usage of the first communication layer by the first wireless communication devices; and
establish the second communication layer in response to detecting that the bandwidth usage of the first communication layer is above a threshold value.

25. The system as in claim 19, wherein the wireless base station is further operative to:
- receive an identity of a second wireless channel allocated to the wireless base station;
- implement the first communication layer via first communications from first antenna hardware of the wireless base station to the first wireless communication devices using the first wireless channel; and
- implement the second communication layer via second communications from second antenna hardware of the wireless base station to the second wireless communication devices using the second wireless channel.

26. The system as in claim 25, wherein the wireless base station is further operative to:
- implement the second communication layer via third communications from the second antenna hardware of the wireless base station to the second wireless communication devices using the first wireless channel.

27. The system as in claim 26, wherein the wireless base station is further operative to:
- in response to detecting that communications transmitted from the second communication layer fall below a threshold value, notify the communication management resource to deallocate the second wireless channel from the wireless base station.

28. The system as in claim 19, wherein the wireless base station is further operative to:
- partition the first communication layer into first spatially distinct sectors; and
- partition the second communication layer into second spatially distinct sectors.

29. The system as in claim 28, wherein the wireless base station is further operative to:
- implement use of the first wireless channel via simultaneous use of the first wireless channel in the first spatially distinct sectors and the second spatially distinct sectors.

30. The system as in claim 19, wherein the wireless base station is further operative to:
- establish the second communication layer at the wireless base station in response to detecting that a magnitude of the load of the first communication layer communicating the data is above a threshold level.

31. The system as in claim 30, wherein the wireless base station is further operative to:
- in response to communicating a request for additional bandwidth from the wireless base station to the communication management resource, receive allocation of a second wireless channel; and
- implement the second communication layer to communicate with the second wireless communication devices via the first wireless channel and the second wireless channel.

32. A method comprising:
- receiving allocation of a first wireless channel from a communication management resource;
- via a wireless base station in communication with a remote network:
  - i) establishing a first communication layer in which to communicate with first wireless communication devices using the allocated first wireless channel;
  - ii) depending on a load of the first communication layer communicating data, establishing a second communication layer in which to communicate with second wireless communication devices using the allocated first wireless channel;
- wherein first antenna hardware and second antenna hardware of the wireless base station are vertically spaced apart from each other, the method further comprising:
- via the first antenna hardware of the wireless base station:
  - i) providing notification of a first cell identity assigned to the first communication layer, and ii) implementing use of the first wireless channel in the first communication layer to support wireless communications with the first wireless communication devices; and
- via the second antenna hardware of the wireless base station: i) providing notification of a second cell identity assigned to the second communication layer, and ii) implementing use of the first wireless channel in the second communication layer to support wireless communications with the second wireless communication devices.

33. A method comprising:
- receiving allocation of a first wireless channel from a communication management resource;
- via a wireless base station in communication with a remote network:
  - i) establishing a first communication layer in which to communicate with first wireless communication devices using the allocated first wireless channel;
  - ii) depending on a load of the first communication layer communicating data, establishing a second communication layer in which to communicate with second wireless communication devices using the allocated first wireless channel;
- wherein first antenna hardware and second antenna hardware of the wireless base station are vertically spaced apart from each other, the method further comprising:
- via first communications from the first antenna hardware of the wireless base station: i) providing notification of a first cell identity assigned to the first communication layer, and ii) implementing use of the first wireless channel in the first communication layer to support wireless communications with the first wireless communication devices; and
- via second communications from the second antenna hardware of the wireless base station: i) providing notification of a second cell identity assigned to the second communication layer, and ii) implementing use of the first wireless channel in the second communication layer to support wireless communications with the second wireless communication devices.

34. The method as in claim 33, wherein the second antenna hardware is disposed vertically higher on the wireless base station than the first wireless base station, the method further comprising:
- controlling transmission of the first communications from the first antenna hardware to provide a first wireless range associated with the first communication layer; and
- controlling transmission of the second communications from the second antenna hardware to provide a second wireless range associated with the second communication layer, the second wireless range greater than the first wireless range.

35. A method comprising:
- receiving allocation of a first wireless channel from a communication management resource;
- via a wireless base station in communication with a remote network:
  - i) establishing a first communication layer in which to communicate with first wireless communication devices using the allocated first wireless channel;

ii) depending on a load of the first communication layer communicating data, establishing a second communication layer in which to communicate with second wireless communication devices using the allocated first wireless channel;

wherein the second antenna hardware is disposed vertically higher on the wireless base station than the first antenna hardware, the method further comprising:

via the allocated first wireless channel and the first antenna hardware, providing first wireless connectivity over the first communication layer to the first wireless communication devices;

via an allocated second wireless channel and the second antenna hardware, providing second wireless connectivity over the second communication layer to the second wireless communication devices; and in response to detecting use of the allocated second wireless channel by an incumbent entity: i) terminating use of the second wireless channel and the second wireless connectivity at the second communication layer of the wireless base station, and ii) continuing to support the first wireless connectivity and the first communication layer via the allocated first wireless channel.

\* \* \* \* \*

UNITED STATES PATENT AND TRADEMARK OFFICE
CERTIFICATE OF CORRECTION

| | |
|---|---|
| PATENT NO. | : 11,690,137 B2 |
| APPLICATION NO. | : 17/015745 |
| DATED | : June 27, 2023 |
| INVENTOR(S) | : Volkan Sevindik and Haider H. Syed |

It is certified that error appears in the above-identified patent and that said Letters Patent is hereby corrected as shown below:

In the Claims

Column 26, Claim 19, Line 18, replace ":" with --;--

Signed and Sealed this
Nineteenth Day of September, 2023

*Katherine Kelly Vidal*

Katherine Kelly Vidal
*Director of the United States Patent and Trademark Office*